US010315289B2

(12) United States Patent
Kasai et al.

(10) Patent No.: US 10,315,289 B2
(45) Date of Patent: Jun. 11, 2019

(54) CONGLOMERATE ABRASIVE PARTICLES, ABRASIVE ARTICLES INCLUDING THE SAME, AND METHODS OF MAKING THE SAME

(71) Applicant: 3M INNOVATIVE PROPERTIES COMPANY, St. Paul, MN (US)

(72) Inventors: Toshikazu Kasai, Woodbury, MN (US); John J. Gagliardi, Hudson, WI (US); Timothy D. Fletcher, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 104 days.

(21) Appl. No.: 15/100,585

(22) PCT Filed: Dec. 8, 2014

(86) PCT No.: PCT/US2014/069034
§ 371 (c)(1),
(2) Date: May 31, 2016

(87) PCT Pub. No.: WO2015/088953
PCT Pub. Date: Jun. 18, 2015

(65) Prior Publication Data
US 2016/0303711 A1 Oct. 20, 2016

Related U.S. Application Data

(60) Provisional application No. 61/913,659, filed on Dec. 9, 2013.

(51) Int. Cl.
*B24D 3/02* (2006.01)
*B24D 11/00* (2006.01)
(Continued)

(52) U.S. Cl.
CPC .............. *B24D 3/14* (2013.01); *B24D 11/001* (2013.01); *C09K 3/1436* (2013.01)

(58) Field of Classification Search
USPC .......................................... 51/293, 307, 309
See application file for complete search history.

(56) References Cited

U.S. PATENT DOCUMENTS 2,216,728 A 10/1940 Benner
4,652,274 A 3/1987 Boettcher
(Continued)

FOREIGN PATENT DOCUMENTS

TW 201002805 A 1/2010
TW 201120200 A 6/2011

OTHER PUBLICATIONS

International Search Report for PCT International Application No. PCT/US2014/069034, dated Mar. 5, 2015. 9 pgs.

*Primary Examiner* — James E McDonough
(74) *Attorney, Agent, or Firm* — Bradford B. Wright

(57) ABSTRACT

A method of making conglomerate abrasive particles includes: providing agglomerate abrasive particles comprising mineral particles in a first vitreous binder; combining the agglomerate abrasive particles with a second vitreous binder material precursor to form precursor conglomerate abrasive particles; and heating the precursor conglomerate abrasive particles to convert the second vitreous binder material precursor into a second vitreous binder, different from the first vitreous binder, thereby forming the conglomerate abrasive particles. The first vitreous binder differs from the second vitreous binder by at least one of: i) elemental composition, or ii) an intrinsic physical property; and wherein the conglomerate abrasive particles can pass through a testing sieve having one-millimeter openings.

(Continued)

Conglomerate abrasive particles preparable by the method, and abrasive articles containing them, are also disclosed.

7 Claims, 3 Drawing Sheets

(51) Int. Cl.
| | |
|---|---|
| *C09K 3/14* | (2006.01) |
| *B24D 3/14* | (2006.01) |
| *B24D 3/00* | (2006.01) |
| *B24D 18/00* | (2006.01) |

(56) References Cited

U.S. PATENT DOCUMENTS

| | | |
|---|---|---|
| 4,751,138 A | 6/1988 | Tumey |
| 4,903,440 A | 2/1990 | Larson |
| 4,985,340 A | 1/1991 | Palazzotto |
| 5,086,086 A | 2/1992 | Brown-Wensley |
| 5,152,917 A | 10/1992 | Pieper |
| 5,236,472 A | 8/1993 | Kirk |
| 5,304,223 A | 4/1994 | Pieper |
| 5,368,619 A | 11/1994 | Culler |
| 5,376,428 A | 12/1994 | Palazzotto |
| 5,385,954 A | 1/1995 | Palazzotto |
| 5,435,816 A | 7/1995 | Spurgeon |
| 5,437,754 A | 8/1995 | Calhoun |
| 5,454,844 A | 10/1995 | Hibbard |
| 5,958,794 A | 9/1999 | Bruxvoort |
| 5,975,988 A | 11/1999 | Christianson |
| 6,217,413 B1 | 4/2001 | Christianson |
| 6,319,108 B1 | 11/2001 | Adefris |
| 6,521,004 B1 | 2/2003 | Culler |
| 6,551,366 B1 | 4/2003 | D'Souza |
| 6,620,214 B2 | 9/2003 | McArdle |
| 6,702,650 B2 | 3/2004 | Adefris |
| 6,790,126 B2 | 9/2004 | Wood |
| 6,881,483 B2 | 4/2005 | McArdle |
| 6,913,824 B2 | 7/2005 | Culler |
| 7,169,031 B1 | 1/2007 | Fletcher |
| 7,399,330 B2 | 7/2008 | Schwabel |
| 7,494,519 B2 | 2/2009 | Fletcher |
| 7,887,608 B2 | 2/2011 | Schwabel |
| 8,323,072 B1 | 12/2012 | Billig |
| 2002/0151265 A1* | 10/2002 | Adefris ................ B24D 3/18 451/490 |
| 2003/0194947 A1* | 10/2003 | Bright ................ B24B 5/363 451/28 |
| 2004/0185754 A1 | 9/2004 | Adefris |
| 2007/0084133 A1* | 4/2007 | Schwabel ............ B24D 3/16 51/307 |
| 2009/0100766 A1 | 4/2009 | Gebhardt |
| 2009/0235591 A1* | 9/2009 | Yener ................ B24D 11/00 51/308 |
| 2012/0297692 A1 | 11/2012 | Sarangi |
| 2013/0152482 A1* | 6/2013 | Sarangi ............ C09K 3/1409 51/309 |

* cited by examiner

CONGLOMERATE ABRASIVE PARTICLES, ABRASIVE ARTICLES INCLUDING THE SAME, AND METHODS OF MAKING THE SAME

TECHNICAL FIELD

The present disclosure broadly relates to abrasive particles, methods of making abrasive particles, and abrasive articles.

BACKGROUND

Vitreous bonded agglomerate abrasive particles have been reported in the art. For example, see U.S. Pat. No. 6,551,366 (D'Souza et al.); U.S. Pat. No. 6,521,004 (Culler et al.); U.S. Pat. No. 6,790,126 (Wood et al.); U.S. Pat. No. 6,913,824 (Culler et al.); and U.S. Pat. No. 7,887,608 (Schwabel et al.).

Similarly, vitreous bonded aggregate abrasive particles have been reported in the art. For example, see U.S. Pat. No. 2,216,728 (Benner et al.); U.S. Pat. No. 7,399,330 (Schwabel et al.); U.S. Pat. No. 6,620,214 (McArdle et al.); and U.S. Pat. No. 6,881,483 (McArdle et al.).

The terms "agglomerate" and "aggregate" as applied above are used more or less interchangeably, and generally all of the above abrasive particles include mineral particles bonded to one another by a vitreous binder material.

Abrasive agglomerate/aggregate particles are useful, for example, in polishing slurries and in structured abrasive articles for use in prime wafer (silicon) abrading and sapphire polishing. Structured abrasive articles are coated abrasive articles having an abrasive layer secured to a major surface of a backing. The abrasive layer comprises shaped abrasive composites of abrasive particles in a binder material.

There remains a need for vitreous bonded abrasive particles that have improved abrasive properties in certain abrading applications.

SUMMARY

In one aspect, the present disclosure provides a method of making conglomerate abrasive particles, the method comprising:

providing agglomerate abrasive particles comprising mineral particles in a first vitreous binder material;

combining the agglomerate abrasive particles with a second vitreous binder material precursor to form precursor conglomerate abrasive particles; and heating the precursor conglomerate abrasive particles to convert the second vitreous binder material precursor into a second vitreous binder material, different from the first vitreous binder material, thereby forming the conglomerate abrasive particles, wherein the first vitreous binder material differs from the second vitreous binder material by at least one of:

i) elemental composition, or
ii) an intrinsic physical property.

In another aspect, the present disclosure provides conglomerate abrasive particles made according to the preceding method of making conglomerate abrasive particles.

In yet another aspect, the present disclosure provides conglomerate abrasive particles comprising agglomerate abrasive particles, the agglomerate abrasive particles comprising mineral particles and a first vitreous binder material, wherein the agglomerate abrasive particles are bonded together by a second vitreous binder material, and wherein the first vitreous binder material differs from the second vitreous binder material by at least one of:

i) elemental composition, or
ii) an intrinsic physical property.

In yet another aspect, the present disclosure provides an abrasive article comprising conglomerate abrasive particles retained in a binder matrix, wherein the conglomerate abrasive particles comprise agglomerate abrasive particles, the agglomerate abrasive particles comprising mineral particles and a first vitreous binder material, wherein the agglomerate abrasive particles are bonded together by a second vitreous binder material, and wherein the first vitreous binder material differs from the second vitreous binder material by at least one of:

i) elemental composition, or
ii) an intrinsic physical property.

In some embodiments, the abrasive article comprises a structured abrasive article comprising an abrasive layer secured to a major surface of a backing, wherein the abrasive layer comprises shaped abrasive composites, and wherein at least some of the shaped abrasive composites comprise the conglomerate abrasive particles retained in the binder matrix.

Advantageously, conglomerate abrasive particles, when included in structured abrasive articles according to the present disclosure, generally exhibit improved abrasive performance (e.g., cut rate) as compared to corresponding abrasive agglomerate and/or aggregate particles that they contain.

As used herein, the term "testing sieve having one-millimeter openings" refers to a testing sieve according to ASTM E11-13 "Standard Specification for Woven Wire Testing sieve Cloth and Testing sieves" having a substantially square sieve opening of one-millimeter on a side;

the term "abrasive particle" refers to a particle having a Mohs hardness of at least 8, preferably at least 9;

the term "bearing area ratio" refers to the ratio of the total abrading surface contact area (i.e., the distal ends of shaped abrasive composites) to the to the total area of the abrasive layer of a structured abrasive article;

the term "binder material" refers to a material forming a continuous matrix through which particles are held together;

the term "conglomerate abrasive particle" refers to an abrasive particle comprising agglomerate abrasive particles and/or aggregate abrasive particles bonded to one another by a binder material;

the term "spheroidally shaped" includes spheres as well as bodies that are shaped like a sphere but are not perfectly round. e.g., ellipsoid that is generated by revolving an ellipse around one of its axes:

the term "superabrasive" refers collectively or individually to diamond and/or cubic boron nitride; and the term "vitreous binder material" refers to a glassy binder material (e.g., glass or glass-ceramic) that may contain additional components such as, for example, filler particles.

Features and advantages of the present disclosure will be further understood upon consideration of the detailed description as well as the appended claims.

Figure 1:
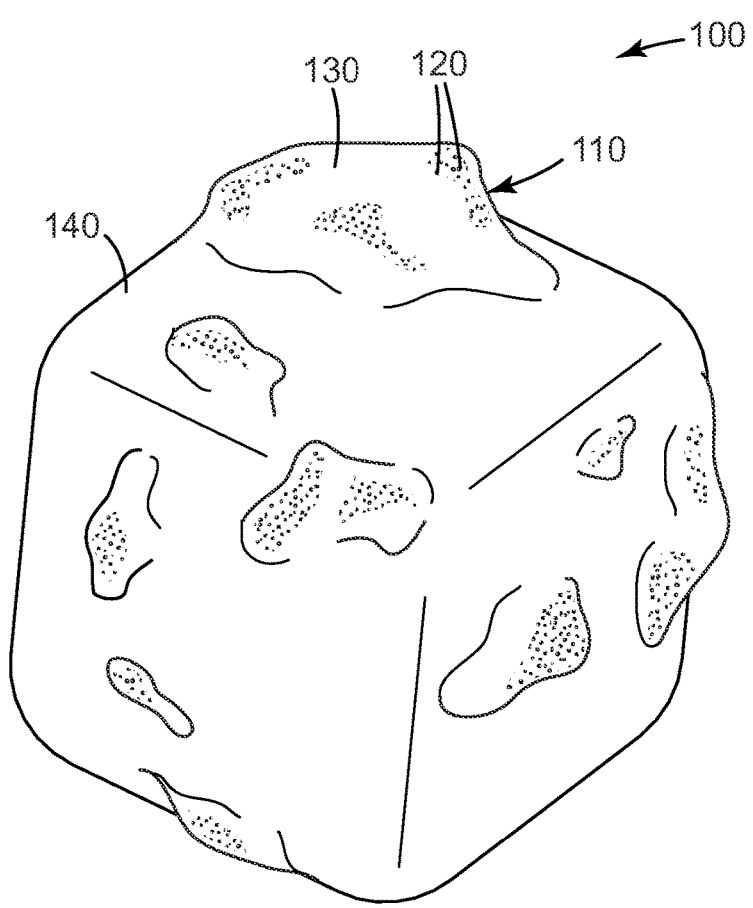
FIG. 1 is a schematic perspective view of a conglomerate abrasive particle according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, conglomerate abrasive particles 100 comprise agglomerate particles 110. Agglomerate particles 110 comprise mineral particles 120 bonded together by first vitreous binder material 130. Agglomerate particles 110 are bonded together by second vitreous binder material 140.

The agglomerate abrasive particles and methods for their manufacture will now be discussed in greater detail. In one exemplary method, a first slurry of mineral particles, glass frit, and a first temporary organic binder in a liquid carrier are spray-dried to form agglomerate abrasive precursor particles. The abrasive precursor particles are then heated, preferably in the presence of a second mineral particle, to prevent the abrasive precursor particles from fusing to one another, to form the agglomerate abrasive particles, typically in a substantially spherical form. During heating, the first temporary organic binder burns off, and the glass frit forms a vitreous (i.e., glassy) binder material that retains the mineral particles. Details of such procedure can be found, for example, in U.S. Pat. No. 6,551,366 (D'Souza et al.).

Suitable mineral particles preferably have a Mohs hardness of at least about 5. The mineral particles include first mineral particles and optionally second mineral particles.

In some embodiments, the Mohs hardness of the first mineral particles may be as high as at least 6, 7, 8, 9, or even 10. Exemplary mineral particles having a Mohs hardness of at least about 5 include diamond particles, silicon carbide particles, aluminum oxide particles, zirconium oxide particles, modified ceramic aluminum oxide particles, cubic boron nitride (CBN) particles, titanium carbide particles, titanium nitride particles, cerium oxide particles, silicon dioxide particles, and combinations thereof. Preferably at least a portion, more preferably a majority by weight, and more preferably all of the agglomerate mineral particles are selected from the group consisting of diamond particles, silicon carbide particles, aluminum oxide particles, zirconium oxide particles, modified ceramic aluminum oxide particles, cubic boron nitride particles, titanium carbide particles, titanium nitride particles, cerium oxide particles, silicon dioxide particles, and combinations thereof.

The particle size of the first mineral particles can vary. The average first mineral particle size (i.e., the largest dimension) is not particularly limited, and is selected based on the desired stock removal rate and surface finish in the end use application. Subsequently, the average mineral particle size may vary from about 0.01 micron to about 0.1 mm. Typically, the average first mineral particle size (i.e., the largest dimension) is in the range from about 0.01 micron to about 100 microns, preferably from about 0.05 micron to about 50 microns, more preferably about 0.1 micron to about 25 microns, and even more preferably from about 0.1 to 15 microns. The average particle size of the first mineral particles can vary with respect to the average particle size of the plurality of agglomerate mineral particles in which they are contained. Typically, the average particle size of the first mineral particles is about 0.5 to about 50 percent of the average particle size of the agglomerate mineral particles, preferably about 1 to about 40 percent, and more preferably about 2 to about 20 percent.

The glass frit is at least partially fused during the heating that follows the spray-drying, and serves to primarily bond the first mineral particles together. Different types of glass frit may be used including, for example, glass frit selected from the group consisting of silica glass frit, silicate glass frit, borosilicate glass frit, and combinations thereof. A silica glass frit is typically composed of 100 percent by weight of silica. An exemplary silicate glass frit composition comprises about 70 to about 80 percent by weight of silica, about 10 to about 20 percent sodium oxide, about 5 to about 10 percent calcium oxide, about 0.5 to about 1 percent aluminum oxide, about 2 to about 5 percent magnesium oxide, and about 0.5 to about 1 percent potassium oxide, based on the total weight of the glass frit. Another exemplary silicate glass frit composition includes about 73 percent by weight of silica, about 16 percent by weight of sodium oxide, about 5 percent by weight of calcium oxide, about 1 percent by weight of aluminum oxide, about 4 percent by weight of magnesium oxide, and about 1 percent by weight of potassium oxide, based on the total weight of the glass frit. An exemplary borosilicate glass frit composition comprises about 50 to about 80 percent by weight of silica, about 10 to about 30 percent by weight of boron oxide, about 1 to about 2 percent by weight of aluminum oxide, about 0 to about 10 percent by weight of magnesium oxide, about 0 to about 3 percent by weight of zinc oxide, about 0 to about 2 percent by weight of calcium oxide, about 1 to about 5 percent by weight of sodium oxide, about 0 to about 2 percent by weight of potassium oxide, and about 0 to about 2 percent by weight of lithium oxide, based on the total weight of the glass frit. Another exemplary borosilicate glass frit composition includes about 52 percent by weight of silica, about 27 percent by weight of boron oxide, about 9 percent by weight of aluminum oxide, about 8 percent by weight of magnesium oxide, about 2 percent by weight of zinc oxide, about 1 percent by weight of calcium oxide, about 1 percent by weight of sodium oxide, about 1 percent by weight of potassium oxide, and about 1 percent by weight of lithium oxide, based on the total weight of the glass frit. Another exemplary alumina-borosilicate glass frit composition includes glass frit having a composition of about 63.6 percent by weight $SiO_2$, about 18 percent by weight $B_2O_3$, about 8.5 percent by weight $Al_2O_3$, about 2.8 percent by weight BaO, 1.1 percent by weight CaO, 2.1 percent by weight $Na_2O$, 2.9 percent by weight $K_2O$, 1.0 percent by weight $Li_2O$, available as "SP 1086" from Specialty Glass, Inc., Oldsmar, Fla.

Glass frit for making glass-ceramics may be selected from the group consisting of magnesium aluminosilicate, lithium aluminosilicate, zinc aluminosilicate, calcium aluminosilicate, and combinations thereof. Known crystalline ceramic phases that can form glasses within the above listed systems include: cordierite ($2MgO.2Al_2O_3.5SiO_2$), gehlenite ($2CaO.Al_2O_3.SiO_2$), anorthite ($2CaO.Al_2O_3.2SiO_2$), hardystonite ($2CaO.ZnO.2SiO_2$), akeranite ($2CaO.MgO_2SiO_2$), spodumene ($2Li_2O.Al_2O_3.4SiO_2$), willemite ($2ZnO.SiO_2$), and gahnite ($ZnO.Al_2O_3$). Glass frit for making glass-ceramic may comprise nucleating agents. Nucleating agents are known to facilitate the formation of crystalline ceramic phases in glass-ceramics.

The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art.

Typically, glass-ceramics are stronger than the glasses from which they are formed. Hence, the strength of the first vitreous binder may be adjusted, for example, by the degree to which the glass is converted to crystalline ceramic phase(s). Alternatively, or in addition, the strength of the first vitreous binder may also be affected, for example, by the number of nucleation sites created, which may in turn be used to affect the number, and in turn the size of the crystals of the crystalline phase(s).

The size of the glass frit utilized in the first slurry can vary. The average particle size of the glass frit is not particularly limited and is selected based the particle size of the first mineral particle. Typically, the average particle size of the glass frit is about 1 to about 200 percent of the average particle size of the first mineral particles, preferably about 10 to about 100 percent, and more preferably about 15 to about 50 percent. Typically, the average particle size of the glass frit ranges from about 0.01 micron to about 100 microns, preferably about 0.05 micron to about 50 microns, and more preferably about 0.1 micron to about 25 microns. The average particle size of the glass frit in relation to the average particle size of the first mineral particles having a Mobs hardness of at least about 5 can vary. Typically, the weight ratio of glass frit to first mineral particles in the first slurry ranges from about 10:90 to about 90:10. The shape of the glass frit particles can also vary. Typically, the glass frit particles are irregular in shape.

The first slurry typically comprises about 5 percent to about 75 percent by weight of glass frit, based upon the total weight of the first slurry, preferably about 10 to about 50 percent by weight, and more preferably about 20 to about 30 percent by weight. The agglomerate mineral particles prepared according to the method of the present disclosure typically comprise about 1 to about 90 percent by weight glass bonding material, based upon the total weight of the respective agglomerate abrasive grain, preferably about 10 to about 80 percent by weight, and more preferably about 40 to about 60 percent by weight.

Examples of suitable liquid carriers include water and non-aqueous organic solvents. Examples of useful non-aqueous solvents include alcohols such as ethyl alcohol and isopropanol, and ketones such as methyl ethyl ketone. Typically, the liquid carrier used is water. The liquid carrier serves to disperse and/or dissolve the binder material, disperse the glass frit and first mineral particles, and affect first slurry characteristics such as solids content and viscosity. Typically, the first slurry comprises about 20 to about 80 percent by weight of liquid carrier, based upon the total weight of the first slurry, preferably about 40 to about 60 percent by weight, and more preferably about 30 to about 50 percent by weight.

Preferably, the solvent-soluble binder material and/or solvent-dispersible binder material present in the first slurry is selected from the group consisting of water-soluble binder materials, water-dispersible binder materials, and combinations thereof, since water is the preferred liquid carrier. The binder material preferably binds the glass frit and first mineral particles together during the spray-drying process. Examples of useful water-soluble binder materials include, but are not limited to, those selected from the group consisting of methyl cellulose, hydroxyl ethyl cellulose, sodium carboxymethyl cellulose and polyvinyl alcohol. Examples of useful water-dispersible binder materials include, but are not limited to, waxes.

The amount of solvent-soluble and/or solvent-dispersible binder material contained in the first slurry can vary. Typically, the first slurry comprises about 0.5 to about 40 percent by weight of the solvent-soluble and/or solvent-dispersible binder material, based upon the total weight of the first slurry, preferably about 3 to about 30 percent by weight, and more preferably about 5 to about 15 percent by weight.

During the heating, which is subsequent to the formation of the spray-dried precursor agglomerate abrasive precursor particles, the solvent-soluble and/or solvent-dispersible binder material is preferably at least partially pyrolyzed, more preferably substantially pyrolyzed (i.e., greater than about 50 percent, preferably at least about 75 percent, more preferably at least about 90 percent by weight of the solvent-soluble and/or solvent-dispersible binder material is pyrolyzed) and more preferably completely pyrolyzed. Thus, the agglomerate abrasive precursor particles typically comprise about 0 to about 40 percent by weight solvent-soluble and/or solvent-dispersible binder material based upon the total weight of the agglomerate abrasive precursor particles, preferably about 0 to about 30 percent by weight, more preferably about 0 to about 5 percent by weight, and more preferably about 0 percent by weight.

The first slurry may optionally further comprise one or more additives including, but not limited to those selected from the group consisting of fillers, pore formers, surfactants and silane coupling agents. A sufficient amount of additive may be included to achieve the desired result.

Examples of suitable fillers include those selected from the group consisting of metal carbonates (e.g., calcium carbonate, calcite, limestone, sodium carbonate and magnesium carbonate), silicates (e.g., talc, clays, feldspars, mica, calcium silicate, sodium silicate and anhydrous potassium silicate), metal sulfates (e.g., calcium sulfate, sodium sulfate, aluminum sodium sulfate and aluminum sulfate), salts (e.g., sodium chloride, sodium cryolite, potassium cryolite and magnesium chloride), gypsum, vermiculite, wood flour, carbon black, sulfur, graphite and metal sulfides, and combinations thereof.

Examples of suitable pore formers include but are not limited to those selected from the group consisting of phenolic particles, polyurethane foam particles, styrene particles and alumina particles.

Examples of suitable surfactants include, but are not limited to, those selected from the group consisting of anionic surfactants, cationic surfactants, nonionic surfactants, amphoteric surfactants, and combinations thereof. Examples of useful specific surfactants, include, but are not limited to, the nonionic surfactant ethoxylated nonylphenol, the anionic surfactants sodium stearate and sodium diisopropylnaphthalenesulfonate, and the cationic surfactant dodecyltrimethylammonium chloride. Typically, the first slurry comprises about 0 to about 5 percent by weight surfactant (if included), based on the total weight of the first slurry, preferably about 0.1 to about 2 percent by weight, and more preferably about 0.2 to about 1 percent by weight.

The viscosity of the first slurry may vary. However, if the viscosity is too high, fouling of the spray-dryer head may occur. If the viscosity of the first slurry is too low, a plurality of hollow precursor agglomerate abrasive grain may result, which is not preferred. Preferably, at least a portion, more preferably the majority, and more preferably the entire plurality of agglomerate abrasive precursor particles as well as the plurality of the final agglomerate abrasive particles are substantially solid, although they may have voids in them, varying their density.

The solids content of the first slurry can vary. However, if the solids content is too high, fouling of the spray-dryer head may occur. If the solids content of the first slurry is too low, a plurality of hollow agglomerate abrasive precursor particles may be formed, which is not preferred. Typically, the solids loading of the first slurry ranges from about 1 to about 50 weight percent, preferably about 10 to about 40 weight percent, and more preferably about 20 to about 35 weight percent, based on the total weight of the first slurry.

The first slurry used to make the agglomerate abrasive particles typically comprises about 5 to about 75 percent by weight of first mineral particles, based upon the total weight of the first slurry, preferably about 10 to about 50 weight percent, and more preferably about 20 to about 30 weight percent.

Suitable spray-dryers are commercially available. An example of a useful commercially available spray-dryer is that available as MOBIL MINOR from GEA Process Engineering. Søborg, Denmark.

During the spray-drying process, the first slurry is typically pumped through an atomizing head, where it is formed into agglomerate abrasive precursor particles, which is subsequently dried in a drying chamber with heat, optionally at reduced pressure.

The spray-dryer may, for example, utilize a rotary wheel atomizer, a single-fluid atomizer head or a two-fluid atomizer head. Many different head designs are available from multiple vendors (e.g., GEA Process Engineering). The spray-dryer may optionally employ ultrasonic vibration as part of the atomization process. The dried agglomerate abrasive precursor particle size may vary depending upon the processing parameters and first slurry characteristics, for example. Increasing fluid pressure through a fluid atomizer head, the frequency of the ultrasonic vibration, and/or spinning rate of a rotary wheel atomizer typically results in the formation of smaller sized agglomerate abrasive precursor particles. Similarly, decreasing the viscosity and surface tension of the first slurry typically results in a decrease in the agglomerate abrasive precursor particle size, as will reducing the solids content of the first slurry. Conversely, decreasing the fluid pressure through a fluid atomizer head, decreasing the frequency of the ultrasonic vibration, decreasing the spinning rate of a rotary wheel, increasing the first slurry viscosity, increasing the first slurry surface tension, increasing the solids loading and/or increasing the feed rate, for example, typically results in larger agglomerate abrasive precursor particles.

Typically, once the agglomerate abrasive precursor particles are formed and entrained in air, they pass through a heating/drying chamber, usually under slightly reduced pressure where they are is dried. The inlet and outlet temperatures of the spray-dryer are preferably sufficiently high to drive off the liquid carrier (e.g., water and/or organic solvent) typically present in the agglomerate abrasive precursor particles, and thereby minimize or prevent agglomerate abrasive precursor particles from building up in the spray-drying chamber and/or piping leading therefrom.

The spray-dryer inlet temperature affects, for example, the drying rate, and ultimately affects the morphology of the agglomerate abrasive precursor particles. If the inlet temperature is too low there may be incomplete drying of the agglomerate abrasive precursor particles. If the inlet temperature is too high there may be, for example, a number of misshapen, non-spherical dried agglomerate abrasive precursor particles, premature partial pyrolysis of the solvent-dispersible and/or solvent-soluble binder material prior to heating, and/or fouling of the atomizing head. Preferably, the inlet temperature of the spray-dryer ranges from about 90° C. to about 400° C., more preferably about 90° C. to about 300° C., and more preferably about 90° C. to about 250° C.

If the outlet temperature is too low, the agglomerate abrasive precursor particles may not dry sufficiently. If the outlet temperature is too high a number of severely misshapen agglomerate abrasive precursor particles may result. A lower inlet temperature, a faster feed rate, and/or a lower solids loading first slurry can contribute to a lower outlet temperature. Preferably, the outlet temperature ranges from about 40° C. to about 250° C., more preferably about 40° C. to 1500°, and more preferably about 40° C. to about 120° C.

The shape of the spray-dried agglomerate abrasive precursor particles is typically primarily dependent on the drying rate. Rapid drying may result in misshapen, hollow or toroidally-shaped agglomerate abrasive precursor particles. Slower drying rates typically result in spherically-shaped agglomerate abrasive precursor particles. If spherical agglomerate abrasive precursor particles are desired, lower inlet temperatures (about 90° C. to about 250° C.) and outlet temperatures (about 40° C. to about 120° C.) are generally preferred, as such temperatures tend to lead to slower drying, allowing the agglomerate abrasive precursor particles to stabilize in a spherical shape before drying.

After drying, the agglomerate abrasive precursor particles are typically removed from the drying chamber in a continuously moving air stream, collected with a baghouse-type filter and/or gravity-assisted cyclone device, and removed for subsequent processing.

Optionally, at least a portion of the plurality of agglomerate abrasive precursor particles can be mixed with second mineral particles, typically prior to heating to a temperature(s) sufficient to at least partially fuse the glass frit. The second mineral particles preferably serve to prevent fusing of the agglomerate abrasive grain together during vitrification of the glass frit. The second mineral particles, if used, preferably have a softening point or melting point or decomposition temperature greater than the maximum temperature employed during heating. Useful second mineral particles preferably and typically have a softening point (for glass materials and the like), or melting point (for crystalline materials and the like), or decomposition temperature, greater than the softening point of the glass frit, wherein it is understood that not all materials have each of a melting point, a softening point, or a decomposition temperature. For a material that does have two or more of a melting point, a softening point, or a decomposition temperature, it is understood that the lower of the melting point, softening point, or decomposition temperature is greater than the softening point of the glass frit. Examples of useful second mineral particles include, but are not limited to, metal oxides (e.g., aluminum oxide and amorphous fused silica), metal nitrides (e.g., silicon nitride) and graphite, as well as the materials listed above for the first mineral particles.

If present, the second mineral particles typically have an average particle size ranging from about 1 to about 50 percent of the average particle size of the agglomerate abrasive precursor particles, preferably about 2 to about 20 percent, and more preferably about 5 to about 10 percent. Typically, about 1 to about 75 percent by weight of second mineral particles are combined with the agglomerate abrasive precursor particles, based upon the total weight of the second mineral particles and the agglomerate abrasive precursor particles, preferably about 5 to about 50 percent by weight, and more preferably about 10 to about 30 percent by weight.

The second mineral particles, or at least a significant portion of them, can typically be separated from the plurality of agglomerate mineral particles after heating, if desired, by sieving, sedimentation, or decanting, for example.

The hardness of the second mineral particle can vary. Typically, if the second mineral particles are not intended to be separated from the agglomerate mineral particles after heating, the second mineral particles would be selected to have a hardness less than the first mineral particles so that the abrasive qualities of the abrasive article would be primarily due to the first mineral particles. If the second mineral particles were to be removed from the agglomerate mineral particles, the hardness of the second mineral particles would not be as relevant. For either situation though, the melting point, decomposition temperature, and/or softening point should be appropriately selected as discussed previously.

The spray-dried agglomerate abrasive precursor particles (and optional second mineral particles, if present) are heated to at least one temperature such that the glass frit at least partially fuses to provide a plurality of agglomerate mineral particles each comprised of the first mineral particles bonded together via glass binder material. Such heating is typically done in a furnace. Suitable furnaces are commercially available, for example, from Fisher Scientific. Pittsburgh. Pa. The spray-dried agglomerate abrasive precursor particles are typically heated to at least partially pyrolyze, preferably, completely pyrolyze, the solvent-dispersible and/or solvent-soluble binder material, and to at least partially fuse (including even completely fusing) the glass frit to provide the agglomerate mineral particles. The temperature(s) for the heating is preferably selected to be high enough to allow for partial to complete pyrolysis of solvent-soluble and/or solvent-dispersible binder and partial to complete fusing of the glass frit, but not so high as to cause complete fusing of all the agglomerate mineral particles such that a solid mass is formed or to cause significant breakdown (e.g., oxidation) of the first mineral particles.

Heating may be conducted in a single-stage or in multiple-stages. The heating is most typically a two-stage process. For a two-stage process the agglomerate abrasive precursor particles are typically heated to and held at a temperature(s) high enough to at least partially pyrolyze the solvent-dispersible and/or solvent-soluble binder but not high enough to at least partially fuse the glass frit. This first-stage is typically conducted at a temperature(s) in the range from about 50° C. to about 600° C., more typically from about 75° C. to about 500° C. The subsequent second-stage of the heating is typically conducted at a temperature(s) suitable to at least partially fuse the glass frit. This second-stage is typically conducted at a temperature in the range from about 400° C. to about 1200° C., more typically about 500° C. to about 850° C. For a single-stage process, the agglomerate abrasive precursor particles are typically heated to and held at a temperature(s) suitable to both at least partially pyrolyze the solvent-dispersible and/or solvent-soluble binder and at least partially fuse the glass frit. The temperature(s) at which the agglomerate mineral particles are held for a single-stage process typically ranges from about 400° C. to about 1200° C., more typically about 500° C. to about 850° C. For either a single-stage process or multiple-stage process, the temperature is typically increased gradually to a desired temperature(s). Typically, the heating lasts for about 500 to about 1500 minutes, more typically about 700 to about 1000 minutes regardless of whether a one-stage or multiple-stage process is employed.

The selection of the heating temperature may depend on a number of factors including, for example, the softening point of the glass frit, the temperature stability of the mineral particles in the precursor agglomerate abrasive grain, and the final porosity and strength of the agglomerate mineral particles desired after heating. The selection of the length of heating may depend on a number of factors, including but not limited to, the amount of solvent-dispersible and/or solvent-soluble binder present in the agglomerate abrasive precursor particles, and the final strength and porosity of the agglomerate abrasive particles desired after heating.

The heating temperature(s) should be greater than the softening point of the glass frit in order to cause the glass frit to at least partially fuse. Preferably, the heating temperature is less than the lower of at least one of a softening point, or melting point, or decomposition temperature of the first mineral particles. If second mineral particles are included, the heating temperature(s) is preferably less than the lower of at least one of a softening point, or melting point, or decomposition temperature of the second mineral particles. The greater the amount of solvent-dispersible and/or solvent-soluble binder, typically the longer the heating. Typically, the greater the strength desired for the agglomerate abrasive particles, the longer the heating. Typically, the greater the porosity desired for the resultant agglomerate abrasive particles, the shorter the heating.

If the first mineral particles present in the agglomerate abrasive precursor particles are susceptible to oxidation, the heating is preferably conducted in a non-oxidizing atmosphere such as vacuum, nitrogen, or argon.

The agglomerate abrasive particles may have a fine grade (i.e., a small particle size). Typically, the agglomerate abrasive particles made according to the method of present disclosure have an average particle size ranging from about 1 micron to about 500 microns, more typically about 1 to about 400 microns, even more typically about 40 to about 400 microns, and most typically about 40 micron to about 200 microns, although this is not a requirement.

The agglomerate abrasive particles may be porous or nonporous. The porosity is typically about 0 to about 60 percent by volume, more typically about 0 to about 25 percent as observed by Scanning Electron Microscopy.

In one embodiment, the method of the disclosure further comprises, after heating, grading the plurality of agglomerate abrasive particles to provide a plurality of the agglomerate abrasive particles having an abrasive industry recognized specified nominal grade, the specified nominal grade having a particle size distribution ranging from fine to coarse.

Preferably, at least a portion, more preferably a majority by weight, and more preferably all the agglomerate abrasive particles prepared according to the method of the present disclosure are substantially spherical (i.e., spheroidal). Spherical agglomerate abrasive particles are easier to handle and typically provide more uniform abrasive properties. However, other shapes such as, for example, ellipsoid and irregularly shaped rounded agglomerate abrasive grain may also be satisfactory for their intended purpose. Preferably at least a portion, more preferably a majority by weight, and more preferably all of the plurality of agglomerate abrasive particles prepared according to the method of the present disclosure are substantially solid, although they may contain voids. Typically, the agglomerate abrasive particles made according to the method of the present disclosure are free-flowing.

Typically, the agglomerate abrasive particles each comprise about 1 to about 90 percent by weight of first mineral particles having a Mohs hardness of at least about 5, based upon the total weight of the respective agglomerate abrasive grain, preferably about 10 percent to about 80 weight percent, and more preferably about 40 to about 60 weight percent.

To form the conglomerate abrasive particles, the agglomerate abrasive particles are bonded together by a second vitreous binder. This is accomplished through a process wherein a second slurry comprising agglomerate abrasive particles, glass frit, a second binder material and optional filler dispersed in a liquid carrier. The second slurry is coated onto a production tool having shaped (preferably "precisely-shaped") cavities thereby filling them. The coated second slurry is at least partially dried resulting in conglomerate abrasive precursor particles, which are separated from the production tool and heated for sufficient time and at sufficient temperature to cause the glass frit to at least partially fuse/vitrify and form the conglomerate abrasive precursor particles. During this process, some of the shape of the mold cavities is typically retained, but some is lost. In preferred embodiments, the mold cavities are cubic. The process will now be discussed in greater detail.

The conglomerate abrasive particles can be, for example, shaped (including precisely-shaped) or irregularly-shaped. A "precisely-shaped conglomerate abrasive particle" refers to a conglomerate abrasive particle having a molded shape that is the inverse of the mold cavity into which the conglomerate abrasive particle was shaped. The shape is retained by the conglomerate abrasive particle after the conglomerate abrasive particle has been removed from the mold. In another embodiment, a precisely or regularly shaped conglomerate abrasive particle is spherical, such as a solidified droplet. The conglomerate abrasive particles are preferably substantially free of agglomerate abrasive particles protruding well beyond the exposed surface of the conglomerate abrasive particles before the abrasive article has been used, although this is not a requirement. Example methods of making precisely shaped conglomerate abrasive particles by using molding techniques are described in U.S. Pat. No. 5,152,917 (Pieper et al.) and U.S. Pat. No. 5,975,988 (Christianson), both incorporated herein by reference. An "irregularly shaped abrasive composite" refers to an abrasive composite having a non-precise or irregular shape. The shape is formed, for example, by crushing a larger particle to form the irregularly shaped abrasive composite.

The conglomerate abrasive particles typically comprises from about 10 to 90 percent by weight of the agglomerate abrasive particles and 90 to 10 percent of a second vitreous binder, although this is not a requirement. Typically, the conglomerate abrasive particles comprise about 15 to 85 percent by weight of agglomerate abrasive particles and 85 to 15 percent by weight of the second vitreous binder.

The second binder holds the agglomerate abrasive particles together. The agglomerate abrasive particles and second vitreous binder form the conglomerate abrasive particles.

Suitable vitreous binders for use as the second vitreous binder include those mentioned for use as the first binder. In some embodiments, the first and second vitreous binders are the same, while in other embodiments they are different with respect to elemental composition and/or elemental composition, or an intrinsic physical property (e.g., density, crystallinity, fracture mechanics, friability, and/or hardness). For example, the second vitreous binder may be less friable than the first vitreous binder.

The conglomerate abrasive particles can generally be made by mixing together a second temporary organic binder, a second binder material precursor, agglomerate abrasive particles, optional filler particles, and a sufficient amount of a liquid carrier (e.g., water and/or organic solvent), typically water, to facilitate molding the ingredients. The resulting mixture is a moldable second slurry. This second slurry is placed into a suitable mold, dried, and the at least partially hardened. Thereafter, conglomerate abrasive precursor particles are removed from the mold. The conglomerate abrasive precursors particles are then converted to conglomerate abrasive particles, for example, by firing or sintering the conglomerate abrasive precursor particles, for example as described in the preparation of the agglomerate abrasive particles discussed above. The firing or sintering may be conducted in the presence of a second mineral particle, to prevent the abrasive precursor particles from fusing to one another, for example as described in the preparation of the agglomerate abrasive particles discussed above The conglomerate abrasive particles of the abrasive articles of the present disclosure may be, and typically are porous, for example, as result of burn out of the second temporary organic binder, and preferably have a measurable porosity. As used herein, the term "porous" can be used to describe either or both the structure of the conglomerate abrasive particle, which is characterized by having pores or voids distributed throughout the conglomerate abrasive particle among the agglomerate abrasive particles.

Typically, the porosity, of the conglomerate abrasive particles occupies at least about 4 percent of the volume of the conglomerate abrasive particle; although in some embodiments it may be desired to have the porosity approaching zero percent. Alternately or additionally, the pores occupy no greater than about 70 percent of the volume of the conglomerate abrasive particle. Typically, the pores occupy about 5 percent to 60 percent of the volume, preferably about 6 percent to 50 percent. A porous second binder can be formed by well-known techniques, for example, by controlled firing of a matrix precursor or by the inclusion of pore forming agents, such as glass bubbles, in the matrix precursor. Conglomerate abrasive particle having high levels of intra-composite porosity generally require a second binder having a high mechanical strength.

The conglomerate abrasive particles may further contain other additives such as fillers, grinding aids, pigments, adhesion promoters, cutting aids, and other processing materials. These additives may be positioned within the pores of the composite, be provided as coatings on the agglomerate abrasive particles, or be dispersed throughout the second binder.

A method for making a conglomerate abrasive particles, useful in the abrasive article of the present disclosure comprises, for example, includes mixing starting materials comprising a second binder material precursor, agglomerate abrasive particles, and a second temporary organic binder. The second binder material precursor will be converted to the second binder. The second temporary organic binder permits the mixture to be more easily shaped and to retain this shape during further processing: typically, the second temporary organic binder is sacrificed (e.g., burned off) during the final steps of making the conglomerate abrasive particles. Optionally, other additives and processing aids, e.g., inorganic fillers, grinding aids, and/or a liquid medium may be used.

These starting materials can be mixed together by any conventional technique which results in a uniform mixture. Preferably, the agglomerate abrasive particles are mixed thoroughly with the second temporary organic binder in a mechanical mixing device such as a planetary mixer. The binder material precursor is then added to the resulting mixture and blended until a homogeneous mixture is achieved, typically 10 to 30 minutes. For finer agglomerate abrasive particles, the preferred method for mixing the abrasive particles and binder material precursor can be to use an ultrasonic bath, for a typical period of about 20 to 30 minutes, with the help of an ultrasonic cleaner which vibrates at approximately 47,000 to 50,000 cycles per second.

The resultant second slurry is then shaped and processed to form conglomerate abrasive precursor particles. The mixture may be shaped, for example, by molding, extrusion, and die cutting. The mixture may alternately be shaped by passing it through a screen, or coating it onto a production tool having shaped cavities using a rotogravure roll, for example. There will typically be some shrinkage associated with the loss of the second temporary organic binder; this shrinkage should be taken into account when determining the desired shape and dimension of the conglomerate abrasive particle. The shaping process can be done in a batch process or in a continuous manner. One preferred technique for shaping the conglomerate abrasive particle is to place the starting materials, which have been combined and formed into a homogenous mixture, into a flexible mold. For example, if conglomerate abrasive particles in the shape of a truncated pyramid are to be formed, the mold will be imprinted with this shape. The flexible mold can be any mold which allows for easy release of the conglomerate abrasive precursor particles, for example, a silicone or polypropylene mold. Additionally, the mold may contain a release agent to aid in the removal of the dried composites. The mold, containing the mixture, is then placed in an oven and heated to least partially remove any liquid. The temperature depends on the second temporary organic binder that may be used, and is typically between 35 to 200° C., preferably, 70 to 150° C. The at least partially dried or hardened mixture is then removed from the mold. It is also possible to completely destroy, i.e., completely burn off the mold, to release the composites.

The conglomerate abrasive particles can include a coating of inorganic particles to increase the surface area and also minimize the aggregation of the conglomerate abrasive particles with one another during their manufacture. One method to achieve the coating is to mix the conglomerate abrasive precursor particles after they are shaped, e.g., removed from the mold, with the inorganic particles in order to apply the inorganic particles, to the conglomerate abrasive precursor particles. A small amount of carrier liquid, or second temporary organic binder, for example, in an amount ranging from 5 to 15 percent by weight, preferably from 6 to 12 percent by weight, based on the weight of the conglomerate abrasive precursor particles, may also be added to aid in securing the inorganic particles to the surface of the conglomerate abrasive precursor particle.

The conglomerate abrasive precursor particles are then heated to burn off any organic materials used to prepare the conglomerate abrasive precursors, for example, the second temporary organic binder, and to melt or vitrify the second vitreous binder; this may occur separately or as one continuous step. The temperature and rate of heating to burn off the organic materials is selected to avoid excessive bubbles which may result in undesirably sized pores in the conglomerate abrasive particle, and generally depends on the chemistry of the optional ingredients including the second temporary organic binder. Typically, the temperature for burning off organic materials ranges from about 100 to 600° C., preferably from 200 to 500° C. although higher temperatures are usable. The temperature for melting or vitrifying the inorganic binder typically ranges between 600 to 1150° C., preferably between 600 to 950° C. In some methods, the binder may not be fully vitrified or hardened; rather, only a partial vitrification or hardening may be done. In some embodiments, the conglomerate abrasive precursor particles are heated at a second temperature that is at least 15° C. lower than the maximum heating temperature used to form the agglomerate abrasive particles temperature.

The resulting conglomerate abrasive particles can then be thermally processed to optimize bond properties. The thermal processing comprises heating at a temperature ranging from 300 to 1,000° C., preferably 350 to 900° C., and more preferably 400 to 800° C.

The conglomerate abrasive particles can pass through a testing sieve having one-millimeter openings. Typically, the conglomerate abrasive particles have a relatively small maximum particle dimension; for example, less than about 10 mm, 5 mm, 2 mm, 1 mm, 200 microns, 100 microns, 50 microns, 20 microns, or even less than 10 microns, although other sizes may be used.

In some embodiments, the conglomerate abrasive particles (and optionally any additional conventionally crushed abrasive particles) are sized according to an abrasives industry recognized specified nominal grade. Exemplary abrasive industry recognized grading standards include those promulgated by ANSI (American National Standards Institute). FEPA (Federation of European Producers of Abrasives), and JIS (Japanese Industrial Standard). Such industry accepted grading standards include, for example: ANSI 120, ANSI 150, ANSI 180, ANSI 220, ANSI 240, ANSI 280, ANSI 320, ANSI 360, ANSI 400, and ANSI 600; FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, and FEPA P1200; and JIS 60, JIS 80, JIS100, JIS150, JIS180, JIS 220, JIS 240, JIS 280, JIS 320, JIS 360, JIS 400, JIS 400, JIS 600, JIS 800, JIS1000, JIS 1500, JIS 2500, JIS 4000, JIS 6000, JIS 8000, and JIS10000.

The term "abrasives industry recognized specified nominal grade" also includes abrasives industry recognized specified nominal screened grades. For example, specified nominal screened grades may use U.S.A. Standard Testing sieves conforming to ASTM E11-13 "Standard Specification for Wire Cloth and Sieves for Testing Purposes." A typical designation may be represented as −18+20, meaning that the particles pass through a testing sieve meeting ASTM E11-13 specifications for the number 18 sieve and are retained on a testing sieve meeting ASTM E11-13 specifications for the number 20 sieve.

In one embodiment, the conglomerate abrasive particles have a particle size such that at least 90 percent of the particles pass through an 18 mesh testing sieve and can be retained on a 20, 25, 30, 35, 40, 45, or 50 mesh testing sieve. In various embodiments, the conglomerate abrasive particles can have a nominal screened grade comprising: −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

Conglomerate abrasive particles made according to the present disclosure may be incorporated into various abrasive articles such as coated abrasives, bonded abrasives (including vitrified and resinoid grinding wheels), nonwoven abrasives, and abrasive brushes. The abrasive articles typically comprise conglomerate abrasive particles made according to the present disclosure and a binder material.

Typically, abrasive articles include conglomerate abrasive particles, according to the present disclosure, secured within the abrasive article by a binder matrix. Methods of making abrasive articles are well known to those skilled in the art. Furthermore, conglomerate abrasive particles made according to the method of the present disclosure can be used in abrasive applications that utilize slurries of abrading compounds (e.g., polishing compounds), milling media, shot blast media, vibratory mill media, and the like.

Exemplary coated abrasive articles comprise an abrasive layer disposed on and secured to a major surface of a backing. The abrasive layer may comprise a make layer (also termed a "make coat"), conglomerate abrasive particles partially embedded in the make layer, and a size layer (also termed a "size coat") disposed on at least a portion (preferably all) of the make layer and conglomerate abrasive particles.

Alternatively, the abrasive layer may comprise a slurry layer (also termed a "slurry coat") of a binder matrix precursor having conglomerate abrasive particles dispersed therein. The name slurry layer is a reference to one common method of producing such coated abrasives in which a slurry of a curable binder matrix precursor and the conglomerate abrasive particles is disposed on the backing and at least partially cured. In some embodiments, the slurry is deposited into cavities formed in a surface of a production tool such that, upon contact with the backing, at least partial curing of the curable binder matrix precursor, and separation from the tool, the resultant abrasive layer is structured according to the pattern of the cavities. Such coated abrasives are commonly referred to as "structured abrasive articles".

Figure 2:
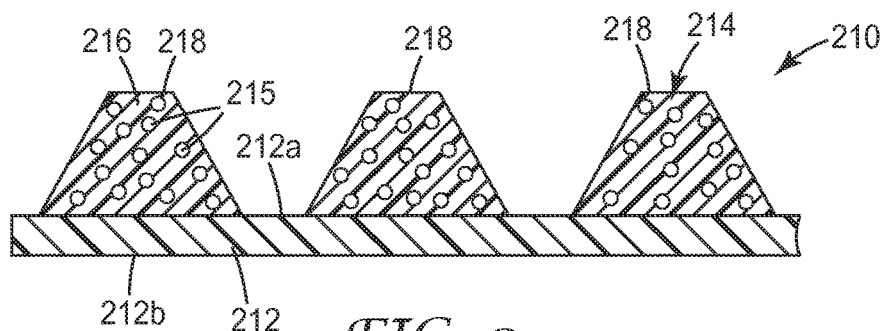
FIG. 2 is a schematic cross-sectional side view of structured abrasive article 200 according to the present disclosure.

Referring now to FIG. 2, exemplary structured abrasive article 200 has a plurality of abrasive particles bonded to backing 212, having a first side 212a and opposite second side 212b. Abrasive layer 214 is present on first side 212a of backing 212. Abrasive layer 214 comprises a plurality of shaped abrasive composites 218, which comprise conglomerate abrasive particles 215 distributed (e.g., dispersed) in binder matrix 216. Shaped abrasive composites 218 are separated by a boundary or boundaries associated with their shape, resulting in one shaped abrasive composite 218 being separated to some degree from another adjacent abrasive composite 218, with a section of the backing 212 visible between shaped abrasive composites. One of the earliest references to structured abrasive articles with precisely-shaped abrasive composites is U.S. Pat. No. 5,152,917 (Pieper et al.). Many others have followed.

Figure 3:
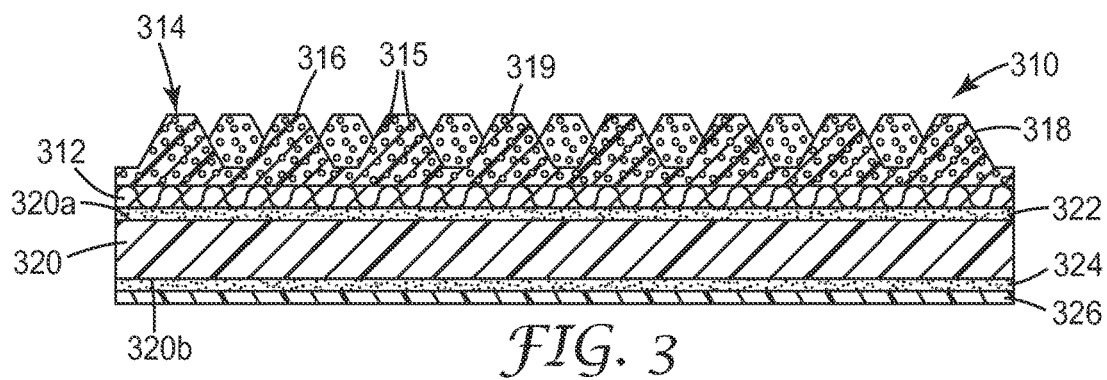
FIG. 3 is a schematic cross-sectional side view of structured abrasive article 300 taken along plane 2-2 in FIG. 4.

Referring now to FIG. 3, exemplary structured abrasive article 300 is shown. Structured abrasive article 300 includes abrasive layer 314 comprising a plurality of shaped abrasive composites 318 attached to backing 312 forming a structured abrasive article. Backing 312 has a substantially continuous layer of conglomerate abrasive particles 315, according to the present disclosure, distributed (e.g., dispersed) in binder matrix 316 forming the plurality of shaped abrasive composites 318 such that backing 312 is no longer visible in the valleys between adjacent shaped abrasive composites 318. Structured abrasive article 300 is attached to optional reinforcing layer 320 (if present) on a first side 320a of reinforcing layer 320, or backing 312, by adhesive layer 322. In some embodiments, optional attachment adhesive layer 324 is present on second side 320b of reinforcing layer 320 to attach the structured abrasive article 300 to a platen of a grinding or polishing machine. Optional removable release liner 326 may be provided on optional adhesive layer 324. Instead of an adhesive interface layer 324 to attach structured abrasive article 300 to a grinding tool, other attachment systems such as hook and loop fasteners, or mechanical fasteners can be used, for example.

Figure 4:
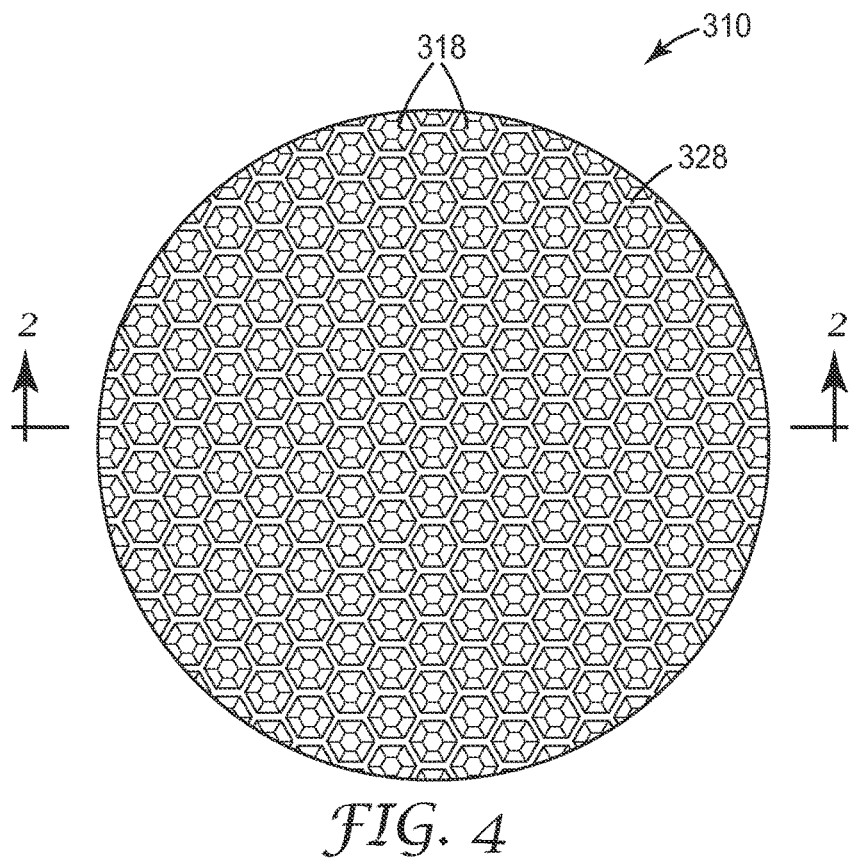
FIG. 4 is a schematic top view of exemplary structured abrasive article 300 according to the present disclosure.

Referring now to FIG. 4, a top-view of structured abrasive article 300 is shown. Structured abrasive article 300 can be in the form of an abrasive disk as shown or other common converted form such as, for example, an endless belt. The plurality of shaped abrasive composites 318, each comprising a hexagonal post separated from adjacent shaped abrasive composites by a network valley region 328. The network valley region 328 allows for grinding lubricant to be readily transported to each of the shaped abrasive composites and for grinding residue (swarf) to be transported away from the working surfaces of the shaped abrasive composites. Alternative shaped abrasive composite shapes include, for example, posts with flat tops (e.g., cylindrical posts, diamond posts, triangular posts, rectangular posts, square posts), tapered structures (e.g., cones, yurt-shaped structures, pyramids and truncated pyramids having from 3 to 6 sides, and combinations thereof).

The spacing of the shaped abrasive composites may vary from about 0.3 shaped abrasive composites per linear cm to about 100 shaped abrasive composites per linear cm, or about 0.4 to about 20 shaped abrasive composites per linear cm, or about 0.5 to 10 shaped abrasive composites per linear cm, or about 0.6 to 3.0 shaped abrasive composites per linear cm. In one aspect of the abrasive article, there are at least about 2 shaped abrasive composites/cm$^2$ or at least about 5 shaped abrasive composites/cm$^2$. In a further embodiment of the invention, the area spacing of shaped abrasive composites ranges from about 1 to about 200 shaped abrasive composites/cm$^2$, or from about 2 to about 10 shaped abrasive composites/cm$^2$.

The height of the abrasive composites as measured from the top of the valley between adjacent shaped abrasive composites to the top of the shaped abrasive composite is constant across the abrasive article 300, but it is possible to have shaped abrasive composites of varying heights. The height of the shaped abrasive composites may be a value from about 10 microns to about 25,000 microns (2.5 cm), or about 25 to about 15,000 microns, or from about 100 to about 10.000 microns, or from about 500 to about 4,000 microns.

In various embodiments, the bearing area ratio can be between about 20 percent to about 80 percent, or between about 20 percent to about 70 percent or between about 50 percent to about 70 percent. The bearing area ratio, expressed as a percentage, is the ratio of the total area of the distal ends 319 of shaped abrasive composites 318 to the total area of the abrasive article including the area of the network valley region 328. As shown in FIG. 3, in some embodiments, shaped abrasive composites having a tapered edge (e.g., truncated pyramid structures) will have a bearing area ratio that changes, as the abrasive article is used and the distal ends of the shaped abrasive composites, in contact with a work piece, are worn away. Depending on the application or the workpiece, a larger or smaller bearing area ratio may desirable depending on the grade of abrasive, the workpiece material, the unit loading pressure, and the desired cut rate and finish.

Useful backings include those known useful in abrasive articles, such as polymeric film, cloth including treated cloth, paper, foam, nonwoven, treated or primed versions thereof, and combinations thereof. Examples include polyester films, polyolefin films (e.g., polyethylene and propylene film), polyamide films, polyimide films and the like. A thin backing can be reinforced using another layer for support, such as a thicker film, or a polycarbonate sheet, for example. In addition, the abrasive article can be attached to a base or sheet or directly to a polishing apparatus or machine via any known route, for example, adhesives including pressure sensitive adhesives are useful.

The backing serves the function of providing a support for the shaped abrasive composites. The backing should be capable of adhering to the binder matrix after exposure of binder matrix precursor to curing conditions, and be strong and durable so that the resulting abrasive article is long lasting. Further, the backing should be sufficiently flexible so that the articles used in the inventive method may conform to surface contours, radii, and irregularities in the workpiece.

As mentioned, the backing may be a polymeric film, paper, vulcanized fiber, a molded or cast elastomer, a treated nonwoven backing, or a treated cloth. Examples of polymeric film include polyester film, co-polyester film, polyimide film, polyamide film, and the like. A nonwoven, including paper, may be saturated with either a thermosetting or thermoplastic material to provide the necessary properties. Any of the above backing materials may further include additives such as: fillers, fibers, dyes, pigments, wetting agents, coupling agents, plasticizers, and the like. In one embodiment, the backing is about 0.05 mm to about 5 mm thick.

The optional reinforcement layer can be used to impart additional stiffness, resiliency, shape stability, and/or flatness to the structured abrasive article. The reinforcement layer can be used to stabilize the abrasive article during shape converting processes such as laser or water jet cutting. Desirably, the reinforcement layer comprises plastic such as polycarbonate or acrylic, metal, glass, composite films, or ceramic. In one embodiment, the optional reinforcement layer is substantially uniform in thickness. Often, the reinforcement layer is desirable to reduce or eliminate deformations in the structured abrasive article due to grinding platens having scratches or gouges that could deform an abrasive article having only a backing layer.

For use in structured abrasive articles, the average size of the conglomerate abrasive particles, which comprises individual mineral particles such as diamond particles, preferably ranges from about 1 micron to about 1000 microns. Often, if the individual mineral particles within the conglomerate abrasive particles are about 15 microns or greater, the overall agglomerate is typically about 100 to about 1000 microns, or about 100 to about 400 microns, or about 210 to about 360 microns. However, when the individual mineral particles have an average size of about 15 microns or less, the overall agglomerate is often about 20 to about 450 microns, or about 40 to about 400 microns, or about 70 to about 300 microns.

The preferred amount of conglomerate abrasive particles in the abrasive layer is dependent on the overall structured abrasive article construction and the process in which it is used. The conglomerate abrasive particles may comprise from about 1 to 30 weight percent, preferably from 2 to 20 weight percent, more preferable from 3 to 15 weight percent of the abrasive layer.

Abrasive articles may optionally include diluent particles. The particle size of these diluent particles may be on the same order of magnitude as the abrasive particles. Examples of such diluent particles include gypsum, marble, limestone, flint, silica, glass bubbles, glass beads, aluminum silicate, and combinations thereof.

The conglomerate abrasive particles are adhered with binder matrix to form shaped abrasive composites. The binder matrix may be inorganic or, more preferably, organic, preferably including a crosslinked organic polymer, and is derived from a binder matrix precursor. During manufacture of a coated/structured abrasive article, the binder matrix precursor is exposed to an energy source which aids in the initiation of the polymerization or curing of the binder matrix precursor. Examples of energy sources include thermal energy and radiation energy, the latter including electron beam, ultraviolet light, and visible light. During this polymerization process, the binder matrix precursor is polymerized or cured and is converted into a solidified binder. Upon solidification of the binder matrix precursor, a matrix of binder material is formed.

The binder matrix can be formed of a curable (via energy such as UV light or heat) organic material. Examples include amino resins, alkylated urea-formaldehyde resins, melamine-formaldehyde resins, and alkylated benzoguanamine-formaldehyde resin, acrylate resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, phenolic resins such as resole and novolac resins, phenolic/latex resins, epoxy resins such as bisphenol epoxy resins, isocyanates, isocyanurates, polysiloxane resins (including alkylalkoxysilane resins), reactive vinyl resins, and phenolic resins (resole and novolac). The resins may be provided as monomers, oligomers, polymers, or combinations thereof.

The binder matrix precursor can be a condensation curable resin, an addition polymerizable resin, a free-radical curable resin, and/or combinations and blends of such resins. One binder matrix precursor is a resin or resin mixture that polymerizes via a free-radical mechanism. The polymerization process is initiated by exposing the binder matrix precursor, along with an appropriate catalyst, to an energy source such as thermal energy or radiation energy. Examples of radiation energy include electron beam, ultraviolet light, or visible light.

Examples of suitable binder matrix precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl. Ethylenically-unsaturated monomers or oligomers, or (meth)acrylate monomers or oligomers, may be monofunctional, difunctional, trifunctional or tetrafunctional, or even higher functionality.

Phenolic resins have good thermal properties, availability, and relatively low cost and ease of handling. There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp., Dallas, Tex.: RESINOX from Monsanto Co., Saint Louis, Mo.; and AEROFENE and AROTAP from Ashland Specialty Chemical Co., Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries. West Paterson, N.J.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 g/mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of (meth)acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically-unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl) isocyanurate, 1,3,5-tris(2-methyacryloxyethyl)-s-triazine, acrylamide, N-methylacrylamide, N,N-dimethylacrylamide. N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanurate derivatives having at least one pendant acrylate group and isocyanate derivatives having at least one pendant acrylate group are further described in U.S. Pat. No. 4,652,274 (Boettcher et al.). An example of one isocyanurate material is the triacrylate of tris(hydroxyethyl) isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxxypropoxy)-phenyl propane](diglycidyl ether of bisphenol) and materials available as EPON 828, EPON 1004, and EPON 1001F from Momentive Specialty Chemicals, Columbus, Ohio; and DER-331. DER-332, and DER-334 from Dow Chemical Co., Midland. Mich. Other suitable epoxy resins include glycidyl ethers of phenol formaldehyde novolac commercially available as DEN-431 and DEN-428 from Dow Chemical Co.

The epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Other examples include an organometallic salt and an onium salt as described in U.S. Pat. No. 4,985,340 (Palazzotto et al.); U.S. Pat. No. 5,086,086 (Brown-Wensley et al.): and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Free-radically polymerizable ethylenically-unsaturated compounds polymerize on exposure to free-radicals formed by decomposition of free-radical thermal initiators and/or photoinitiators, or by exposure to particulate (electron beam) or high energy radiation (gamma rays). Compounds that generate a free-radical source if exposed to actinic electromagnetic radiation (e.g., ultraviolet or visible electromagnetic radiation) are generally termed photoinitiators.

Examples of free-radical thermal initiators include peroxides, e.g., benzoyl peroxide and azo compounds.

Examples of photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (e.g., as commercially available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from Ciba Specialty Chemicals) and 1-hydroxycyclohexyl phenyl ketone (e.g., as IRGACURE 184 from Ciba Specialty Chemicals); 2-methyl-1-[4-(methylthio)phenyl]-2-(4-morpholinyl)-1-propanone (e.g., as IRGACURE 907 from Ciba Specialty Chemicals; 2-benzyl-2-(dimethylamino)-1-[4-(4-morpholinyl)phenyl]-1-butanone (e.g., as IRGACURE 369 from Ciba Specialty Chemicals). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis (eta.sub.5-2,4-cyclopentadien-1-yl)-bis[2,6-diluoro-3-(1H-pyrrol-1-yl)phenyl]titanium (e.g., as CGI 784DC from Ciba Specialty Chemicals); halonitrobenzenes (e.g., 4-bromomethylnitrobenzene), mono- and bis-acylphosphines (e.g., as IRGACURE 1700, IRGACURE 1800, IRGACURE 1850. DAROCUR 4263, and DAROCUR 4265 all from Ciba Specialty Chemicals, and 2,4,6-trimethylbenzoyldiphenylphosphine oxide available as LUCIRIN TPO from BASF Corporation. Charlotte, N.C.). Combinations of photoinitiators may be used.

Typically, the curative (e.g., free-radical initiator (photo or thermal) or cationic cure catalyst) is used in amounts ranging from 0.1 to 10 percent, preferably 2 to 4 percent by weight, based on the weight of the binder material precursor, although other amounts may also be used. Additionally, it is preferred to uniformly disperse or dissolve the initiator in the binder matrix precursor prior to the addition of any particulate material, such as the abrasive particles and/or filler particles. One or more spectral sensitizers (e.g., dyes) may be used in conjunction with the photoinitiator(s), for example, in order to increase sensitivity of the photoinitiator to a specific source of actinic radiation. Examples of suitable sensitizers include thioxanthone and 9,10-anthraquinone. In general, the amount of photosensitizer may vary from about 0.01 to 10 percent by weight, more preferably from 0.25 to 4.0 percent by weight, based on the weight of the binder material precursor. Examples of photosensitizers include those available as QUANTICURE ITX, QUANTICURE QTX, QUANTICURE PTX, QUANTICURE EPD from Biddle Sawyer Corp., New York, N.Y.

To promote an association bridge between the abovementioned binder and the abrasive particles, a silane coupling agent may be included in the slurry of abrasive particles and binder precursor; typically in an amount of from about 0.01 to 5 percent by weight, more typically in an amount of from about 0.01 to 3 percent by weight, more typically in an amount of from about 0.01 to 1 percent by weight, although other amounts may also be used, for example depending on the size of the abrasive particles. Suitable silane coupling agents include, for example, methacryloxypropyltrimethoxysilane, vinyltriethoxysilane, vinyltris(2-methoxyethoxy)silane, 3,4-epoxycyclohexylmethyltrimethoxysilane, gamma-glycidoxypropyltrimethoxysilane, and gamma-mercaptopropyltrimethoxysilane (e.g., as available under the respective trade designations A-174, A-151, A-172, A-186, A-187, and A-189 from Witco Corp. of Greenwich, Conn.), allyltriethoxysilane, diallyldichlorosilane, divinyldiethoxysilane, and meta, para-styrylethyltrimethoxysilane (e.g., as commercially available under the respective trade designations A0564, D4050, D6205, and S 1588 from United Chemical Industries, Bristol, Pa.), dimethyldiethoxysilane, dihydroxydiphenylsilane, triethoxysilane, trimethoxysilane, triethoxysilanol, 3-(2-aminoethylamino)propyltrimethoxysilane, methyltrimethoxysilane, vinyltriacetoxysilane, methyltriethoxysilane, tetraethyl orthosilicate, tetramethyl orthosilicate, ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, dimethyldiethoxysilane, and combinations thereof.

The binder matrix precursor may optionally contain additives such as, for example, colorants, grinding aids, fillers, viscosity modifying agents, wetting agents, dispersing agents, light stabilizers, and antioxidants.

The abrasive layer may further optionally comprise filler particles. Fillers generally have an average particle size range of 0.1 to 50 microns, typically 1 to 30 microns. Examples of useful fillers for this invention include: metal carbonates (such as calcium carbonate-chalk, calcite, marl, travertine, marble, and limestone; calcium magnesium carbonate, sodium carbonate, and magnesium carbonate), silica (such as quartz, glass beads, glass bubbles, and glass fibers), silicates (such as talc, clays-montmorillonite; feldspar, mica, calcium silicate, calcium metasilicate, sodium aluminosilicate, sodium silicate, lithium silicate, and hydrous and anhydrous potassium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide-lime; aluminum oxide; tin oxide— for example, stannic oxide: titanium dioxide) and metal sulfites (such as calcium sulfite), thermoplastic particles (such as polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles). The filler may also be a salt such as a halide salt. Examples of halide salts include sodium chloride, potassium cryolite, sodium cryolite, ammonium chloride, potassium tetrafluoroborate, sodium tetrafluoroborate, silicon fluorides, potassium chloride, and magnesium chloride. Examples of metal fillers include, tin, lead, bismuth, cobalt, antimony, cadmium, iron, and titanium. Other miscellaneous fillers include sulfur, organic sulfur compounds, graphite, and metallic sulfides.

In some embodiments, the binder matrix has high thermal resistance. For example, the cured binder matrix may have has a glass transition temperature ($T_g$) of at least 150° C., at least 160° C., at least 175° C., or even at least 200° C.

The abrasive layer and/or backing may contain additives such as, for example, abrasive particle surface modification additives, grinding aides, coupling agents, fillers, expanding agents, fibers, pore formers, antistatic agents, curing agents, suspending agents, photosensitizers, lubricants, wetting agents, surfactants, pigments, dyes, UV stabilizers, and anti-oxidants. The amounts of these materials are generally selected to provide the properties desired.

The abrasive layer may include pore formers. Pores may be desired for constructions where quick agglomerate or coating break-down is desired. Examples of pore formers include organic materials that are sacrificed; for example, organic materials can be used to occupy volume in the agglomerate or abrasive coating, and then are removed, for example, by burning or dissolving. Examples of sacrificial pore formers are styrene balls and dextrin powder. Pores may also be formed by permanent pore formers, such as glass or alumina hollow beads or bubbles, or by foamed inorganic materials.

An example of a suspending agent is an amorphous silica particle having a surface area less than 150 square meters per gram, commercially available as OX-50 from DeGussa Corp., Ridgefield Park, N.J. The addition of the suspending agent may lower the overall viscosity of the abrasive slurry. The use of suspending agents is further described in U.S. Pat. No. 5,368,619 (Palazzotto et al.).

Abrasive article can be made according to well-known methods. Structured abrasive articles can be made via methods described in U.S. Pat. No. 5,152,917 (Pieper et al.); U.S. Pat. No. 5,435,816 (Spurgeon et al.); U.S. Pat. No. 5,437,754 (Calhoun); U.S. Pat. No. 5,454,844 (Hibbard et al.); and U.S. Pat. No. 5,304,223 (Pieper et al.).

Another useful method of making useful abrasive articles having three-dimensional, abrasive composites where the composites comprise abrasive agglomerates fixed in a make coat, with optional size coatings, is described in U.S. Pat. No. 6,217,413 (Christianson).

Methods for abrading with conglomerate abrasive particles according to the present disclosure range from snagging (i.e., high pressure high stock removal) to polishing (e.g., polishing medical implants with coated abrasive belts), wherein the latter is typically done with finer grades (e.g., less than ANSI 220 and finer) of abrasive particles. The abrasive agglomerate grains may also be used in precision abrading applications, such as grinding cam shafts with vitrified bonded wheels. The size of the conglomerate abrasive particles (and mineral particles comprising such agglomerate abrasive grain) used for a particular abrading application will be apparent to those skilled in the art.

Abrading with conglomerate abrasive particles according to the present disclosure may be done dry or wet. For wet abrading, the liquid may be introduced or supplied in the form of a light mist to complete flood. Examples of commonly used liquids include, for example, water, water-soluble oils, organic lubricants, and emulsions. The liquid may serve to reduce the heat associated with abrading and/or act as a lubricant. The liquid may contain minor amounts of additives such as bactericide, antifoaming agents, and the like. The liquid may include a dressing particle (i.e., a particle capable of abrading and breaking down the surface of the abrasive composite and/or conglomerate abrasive particles) enabling fresh mineral particles to be exposed. Standard dressing techniques, known in the art, may also be employed to dress the abrasive articles.

Accordingly, the present disclosure further provides a polishing method using conglomerate abrasive particles in which the conglomerate abrasive particles are conditioned by conditioning particles which are provided by a slurry or in a fixed abrasive article such that the conditioning particles are capable of dressing the conglomerate abrasive particles within the abrasive composite. An example of a conditioning method that uses conditioning particles to condition abrasive agglomerates is disclosed in U.S. Pat. No. 7,494,519 (Fletcher, et. al.). Typically, the conditioning particles do not appreciably modify the surface of a workpiece while the mineral particles in the fixed abrasive article do modify the surface of the workpiece, when the workpiece and the fixed abrasive article are brought into frictional contact and relatively moved against each other. In some embodiments, the conditioning particles have an average particle size ranging from about 25% to about 200% of the average particle size of the mineral particle within the conglomerate abrasive particles in the abrasive composites, preferably from about 50% to about 150 of the average particle size of the mineral particles.

The mineral particles in the fixed abrasive article may have a first hardness which is capable of abrading a workpiece, while the conditioning particles have a second hardness lower than the hardness of the mineral particles. The hardness of the conditioning particles is preferably chosen such that the conditioning particles can abrade at least one of the first vitreous binder, the second vitreous binder and the binder matrix of the abrasive composite. The conditioning particles will have little, if any, effect on the workpiece. For example, a typical lapping process may take several minutes to several hours to polish a workpiece, but the conditioning particles (of the second hardness) alone would take at least several days, weeks, or months to polish a similar workpiece, if polishing eventually occurred. The conditioning particles may be provided as part of the fixed abrasive article or provided as a separate slurry (i.e., included in the liquid dispensed at the interface between the fixed abrasive article and the workpiece during polishing of the workpiece).

Conglomerate abrasive particles and abrasive articles including them may be used to abrade workpieces such as aluminum metal, carbon steels, mild steels, tool steels, stainless steel, hardened steel, titanium, glass, ceramics, wood, wood-like materials, paint, painted surfaces, organic coated surfaces and the like. The applied force during abrading typically ranges from about 1 to about 100 kilograms.

Select Embodiments of the Present Disclosure

In a first embodiment, the present disclosure provides a method of making conglomerate abrasive particles, the method comprising:
providing agglomerate abrasive particles comprising mineral particles in a first vitreous binder,
combining the agglomerate abrasive particles with a second vitreous binder material precursor to form precursor conglomerate abrasive particles; and
heating the precursor conglomerate abrasive particles to convert the second vitreous binder material precursor into a second vitreous binder, different from the first vitreous binder, thereby forming the conglomerate abrasive particles, wherein the first vitreous binder differs from the second vitreous binder by at least one of:
i) elemental composition, or
ii) an intrinsic physical property.

In a second embodiment, the present disclosure provides a method of making conglomerate abrasive particles according to the first embodiment, wherein the first vitreous binder and the second vitreous binder have the same elemental composition.

In a third embodiment, the present disclosure provides a method of making conglomerate abrasive particles according to the first embodiment, wherein the first vitreous binder and the second vitreous binder have different elemental compositions.

In a fourth embodiment, the present disclosure provides a method of making conglomerate abrasive particles according to any one of the first to third embodiments, wherein the mineral particles comprise diamond particles.

In a fifth embodiment, the present disclosure provides a method of making conglomerate abrasive particles according to the fourth embodiment, wherein the mineral particles have a median size of 0.1 to 15 microns, and the agglomerate abrasive particles have a median size of from 40 to 400 microns, inclusive.

In a sixth embodiment, the present disclosure provides a method of making conglomerate abrasive particles according to any one of the first to fifth embodiments, wherein the agglomerate abrasive particles are spheroidally shaped.

In a seventh embodiment, the present disclosure provides a method of making conglomerate abrasive particles according to any one of the first to sixth embodiments, wherein said providing agglomerate abrasive particles comprises:
forming precursor agglomerate abrasive particles comprising the mineral particles and the first vitreous binder material precursor; and
heating the precursor agglomerate abrasive particles at a first maximum temperature to form the agglomerate abrasive particles.
wherein the precursor conglomerate abrasive particles are heated at a second maximum temperature that is at least 15 degrees Celsius lower than the first maximum temperature.

In an eighth, the present disclosure provides a method of making conglomerate abrasive particles according to the seventh embodiment, wherein said forming precursor agglomerate abrasive particles comprising the mineral particles and the first vitreous binder material precursor comprises:

disposing a composition comprising the mineral particles and the first vitreous binder material precursor in a plurality of mold cavities to form the precursor agglomerate abrasive particles.

In a ninth embodiment, the present disclosure provides a method of making conglomerate abrasive particles according to any one of the first to eighth embodiments, further comprising grading the conglomerate abrasive particles to conform to an abrasives industry specified nominal grade.

In a tenth embodiment, the present disclosure provides a method of making conglomerate abrasive particles according to any one of the first to ninth embodiments, wherein the second vitreous binder is less friable than the first vitreous binder.

In an eleventh embodiment, the present disclosure provides conglomerate abrasive particles comprising agglomerate abrasive particles, the agglomerate abrasive particles comprising mineral particles and a first vitreous binder, wherein the agglomerate abrasive particles are bonded together by a second vitreous binder, and wherein the first vitreous binder differs from the second vitreous binder by at least one of:
 i) elemental composition, or
 ii) an intrinsic physical property.

In a twelfth embodiment, the present disclosure provides conglomerate abrasive particles according to the eleventh embodiment, wherein the first vitreous binder and the second vitreous binder have the same elemental composition.

In a thirteenth embodiment, the present disclosure provides conglomerate abrasive particles according to the eleventh embodiment, wherein the first vitreous binder and the second vitreous binder have different elemental compositions.

In a fourteenth embodiment, the present disclosure provides conglomerate abrasive particles according to any one of the eleventh to thirteenth embodiments, wherein the mineral particles comprise diamond particles.

In a fifteenth embodiment, the present disclosure provides conglomerate abrasive particles according to the fourteenth embodiment, wherein the diamond particles have a median size of 0.1 to 15 microns, and the agglomerate abrasive particles median size is from 40 to 400 microns, inclusive.

In a sixteenth embodiment, the present disclosure provides conglomerate abrasive particles according to any one of the eleventh to fifteenth embodiments, wherein the agglomerate abrasive particles are spheroidally shaped.

In a seventeenth embodiment, the present disclosure provides conglomerate abrasive particles according to any one of the eleventh to sixteenth embodiments, wherein the mineral particles conform to an abrasives industry specified nominal grade.

In an eighteenth embodiment, the present disclosure provides conglomerate abrasive particles according to any one of the thirteenth to seventeenth embodiments, wherein the second vitreous binder is less friable than the first vitreous binder.

In a nineteenth embodiment, the present disclosure provides conglomerate abrasive particles according to any one of the eleventh to eighteenth embodiments, wherein the median size of the conglomerate abrasive particles is at least 2.5 times greater than the median size of the agglomerate abrasive particles.

In a twentieth embodiment, the present disclosure provides an abrasive article comprising conglomerate abrasive particles retained in a binder material, wherein the conglomerate abrasive particles comprise agglomerate abrasive particles, the agglomerate abrasive particles comprising mineral particles and a first vitreous binder, wherein the agglomerate abrasive particles are bonded together by a second vitreous binder, and wherein the first vitreous binder differs from the second vitreous binder by at least one of:
 i) elemental composition, or
 ii) an intrinsic physical property.

In a twenty-first embodiment, the present disclosure provides an abrasive article according to the twentieth embodiment, wherein the abrasive article comprises a structured abrasive article comprising an abrasive layer secured to a major surface of a backing, wherein the abrasive layer comprises shaped abrasive composites, and wherein at least some of the shaped abrasive composites comprise the conglomerate abrasive particles retained in the binder material.

In a twenty-second embodiment, the present disclosure provides an abrasive article according to the twentieth or twenty-first embodiment, wherein the abrasive layer has a bearing area ratio between about 20 percent to about 70 percent.

In a twenty-third embodiment, the present disclosure provides an abrasive article according to any one of the twentieth to twenty-second embodiments, wherein the mineral particles comprise diamond particles.

In a twenty-fourth embodiment, the present disclosure provides an abrasive article according to the twenty-third embodiment, wherein the diamond particles have a median size of 0.1 to 15 microns, and the agglomerate abrasive particles median size is from 40 to 400 microns, inclusive.

In a twenty-fifth embodiment, the present disclosure provides an abrasive article according to any one of the twentieth to twenty-fourth embodiments, wherein the median size of the conglomerate abrasive particles is at least 2.5 times greater than the median size of the agglomerate abrasive particles.

In a twenty-sixth embodiment, the present disclosure provides an abrasive article according to any one of the twentieth to twenty-fourth embodiments, wherein the second vitreous binder is less friable than the first vitreous binder.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials Used in the Examples

| ABBRE-VIATION | DESCRIPTION |
|---|---|
| A174 | 3-methacryloxypropyltrimethoxysilane, available as SILQUEST A-174 from Momentive Performance Materials, Albany, New York |
| GF | alumina-borosilicate glass frit having a composition of 63.6% $SiO_2$, 18% $B_2O_3$, 8.5% $Al_2O_3$, 2.8% BaO, 1.1% CaO, 2.1% $Na_2O$, 2.9% $K_2O$, 1.0% $Li_2O$, and having a median particle size (by light scattering) of about 10.6 microns, available as SP 1086 from Specialty Glass, Inc., Oldsmar, Florida |
| Hy-AlOx | hydrated aluminum oxide, available as BOEHMITE from Sasol North America, Houston, Texas |

-continued

| ABBRE-VIATION | DESCRIPTION |
|---|---|
| IRG819 | bis(2,4,6-trimethylbenzoyl)phenylphosphine oxide, available as IRGACURE 819 from the BASF Corporation, Florham Park, New Jersey |
| OX50 | fumed silica, available as AEROSIL OX50 from Evonik Industries, Parsippany, New Jersey |
| PWA-3 | 3-micron plated white alumina, available as PWA 3 from Fujimi Inc., Kiyosu, Japan |
| PWA-5 | 5-micron plated white alumina, available as PWA 5 from Fujimi Inc. |
| MCD-1 | 4-8 micron monocrystalline diamond, available as RJK-1 from Diamond Innovations Worthington, Ohio |
| SP32000 | polymeric dispersant, available as SOLSPERSE 32000 from Lubrizol, Ltd., Manchester, United Kingdom |
| SR368D | tris(2-hydroxyethyl) isocyanurate triacrylate, available as SR368D from Sartomer USA, LLC, Exton, Pennsylvania |
| Standex230 | dextrin, available as STANDEX 230 from A. E. Staley Manufacturing Company, Decatur, Illinois |
| VAZO 52 | 2,2'-azobis(2,4-dimethylpentanenitrile), available as VAZO 52 from E. I. du Pont de Nemours and Co., Wilmington, Delaware |
| W400 | A surface treated calcium metasilicate filler, available as WOLLASTOCOAT 400 from NYCO, Willsboro, New York |

Test Methods and Preparation Procedures
Polishing Test Method

Polishing was conducted using a CETR CP-4 polisher, available from Bruker Corporation, Billerica, Mass. A sheet of double sided pressure sensitive adhesive tape, available as 3M DOUBLE COATED TAPE 442PC from 3M Company St. Paul, Minn., was then laminated to the side of a structured abrasive pad, e.g. Example 1a, opposite the features. A subpad, a 50 mil (0.13 mm) thick polycarbonate sheet, was laminated to the structured abrasive pad via the 442PC tape. A 7⅜ inch (187 mm) diameter structured abrasive pad with polycarbonate subpad was then die cut from the laminate. The pad with subpad was mounted to the platen of the CP-4 using a double sided adhesive tape. A brass carrier, having three pockets each with a diameter of about 3 inches (7.62 cm), was mounted to the upper drive shaft of the CP-4. Three 3 inch (7.62 cm) diameter C-Plane sapphire wafer, available from GT Crystal Systems LLC, Salem, Mass., were placed in the carrier pockets. The diameter of the carrier holes was slightly larger than the diameter of the sapphire wafers, allowing the wafers to rotate freely in the carrier holes. During polishing, the platen was rotated at 120 rpm, the head of the polisher was rotated at 121 rpm and the applied pressure was 6 psi (13.8 kPa). A lubricant, a 5 weight percent solution of CHALLENGE 543HT, available from Intersurface Dynamics Inc., Bethel, Conn., having weight percent PWA-5 was flowed onto the center of the pad at a rate of about 20 ml/min throughout the polishing test. In some cases, PWA-5 was used in place of PWA-5 for Comparative Example CE-A. Polishing was conducted using the three wafers for 30 minutes. Three wafers were polished on each fixed abrasive pad. The measured weight loss was used to determine the amount of material removed, based on a wafer density of 3.97 g/cm$^3$. Removal rate, reported in microns/minute, is the average thickness reduction of the three wafers over the 30 minute polishing interval.

Preparation of Spray Dried Agglomerate 1 (SDA-1)

Abrasive agglomerates were prepared following the general procedures disclosed in U.S. Pat. No. 6,551,366 (D'Souza, et al.).

A spray dried agglomerate was prepared from an aqueous dispersion, using a spray drying technique, as follows. Standex 230, 1.8 grams, was dissolved in about 40.0 grams of de-ionized water by stirring using an air mixer with a Cowles blade. Next, about 23.3 grams of milled GF was added to the solution. The GF had been milled prior to use to a median particle size of about 2.5 micrometers. About 34.9 grams of MCD-1 diamond was added to the solution, yielding a diamond/glass frit ratio of about 60:40 (wt./wt.). The solution was stirred using the air mixer for an additional 30 minutes after all the above constituents had been added together.

The solution was then atomized in a centrifugal atomizer, a MOBILE MINER 2000 from GEA Process Engineering A/S, Søborg, Denmark. The atomization wheel was running at 20000 rpm. The slurry was pumped into the rotary wheel inlet at a pump speed flow rate setting of 4. Air was supplied at 150° C. into the atomization chamber and was used to dry the droplets as they formed, producing spray dried, precursor abrasive agglomerates. The outlet temperature of the spray dryer varied from 90-95° C.

The precursor abrasive agglomerates were then vitrified by mixing with 40% by weight PWA-3, placing the precursor agglomerate/PWA-3 powder mixture in a refractor sager (available from Ipsen Ceramics of Ipsen Inc., Pecatonica, Ill.) and heating in a furnace in air, forming abrasive agglomerates. The PWA-3 is used as a parting agent to prevent the precursor abrasive agglomerate particles from aggregating together during the vitrifying process. The heating schedule for the vitrifying process was as follows: a 2° C./min temperature ramp to 400° C., a 1 hour anneal at 400° C., a 2° C./min temperature ramp to 720° C., a 1 hour anneal at 720° C., and a 2° C./min ramp to 35° C. The temporary organic binder, Standex230, of the precursor abrasive agglomerates was burned off during the vitrifying step.

After vitrifying, the abrasive agglomerate/PWA-3 powder mixture was sieved through a 106 micrometer mesh screen. The screened abrasive agglomerates were examined using a scanning electron microscope. The abrasive agglomerates were observed via optical microscopy to range in size from about 20 micrometer to about 80 micrometer, with an average size of about 50 micrometer. The agglomerate abrasive grains were predominantly spherical in shape.

The abrasive agglomerate/PWA-3 powder mixture was washed with de-ionized water to remove PWA-3 particles attached to the agglomerate surface and loose PWA-3 particles, using the following procedure. About 200 g of post sieved agglomerates/PWA-3 powder mixture was placed in a stainless container with about 2,000 ml of de-ionized water. The container was placed in an ultrasonic bath (Model 8852 from Cole-Palmer Instrument Co., Chicago, Ill.) set at a frequency of 47 kHz and the slurry was mixed using a conventional mixer for 5 min. After mixing, the container was removed from the bath and allowed to sit, undisturbed, for 5 minutes. During this time, the abrasive agglomerates settled to the bottom of the container, while the majority of the PWA-3 particles remained suspended in the liquid. The liquid was carefully decanted to remove the PWA-3 particles that were suspended in the water. The washing process was repeated at least 3 additional times. After the process, the container with abrasive agglomerates was placed in an oven at 120° C. for 3 hours to vaporize the water and dry the abrasive agglomerates, producing SDA-1.

Preparation of Spray Dried Agglomerate 2 (SDA-2)

SDA-2 was prepared similarly to SDA-1, except the precursor agglomerate/PWA-3 powder mixture was vitrified at 765° C. instead of 720° C.

Preparation of Spray Dried Agglomerate 3 (SDA-3)

SDA-3 was prepared similarly to SDA-1, except the precursor agglomerate/PWA-3 powder mixture was vitrified at 830° C. instead of 720° C.

Preparation of Spray Dried Agglomerate 4 (SDA-4)

SDA-4 was prepared similarly to SDA-1, except the amount of milled GF was 26.2, the amount of MCD-1 diamond used was 32.0 g and the precursor agglomerate/PWA-3 powder mixture was vitrified at 820° C. instead of 720° C.

Preparation of Spray Dried Agglomerate 5 (SDA-5)

SDA-5 was prepared similarly to SDA-1, except the amount of milled GF used was 34.9 and the amount of MCD-1 diamond used was 23.3 g Preparation of Spray Dried Agglomerate 6 (SDA-6)

SDA-6 was prepared similarly to SDA-1, except the amount of milled GF used was 34.9, the amount of MCD-1 diamond used was 23.3 g and the precursor agglomerate/PWA-3 powder mixture was vitrified at 765° C. instead of 720° C.

Preparation of Spray Dried Agglomerate 7 (SDA-7)

SDA-7 was prepared similarly to SDA-1, except the amount of milled GF used was 34.9, the amount of MCD-1 diamond used was 23.3 g and the precursor agglomerate/PWA-3 powder mixture was vitrified at 830° C. instead of 720° C.

Example 1

Conglomerate abrasive particles, having as the abrasive particle SDA-1, were prepared as follows. Standex230, 36.4 parts by weight, was dissolved in 63.6 parts by weight de-ionized water by stirring using an air mixer with a Cowles blade. In a separate container, 61.5 g of the Standex230 solution, 55.40 g of milled GF and 83.1 g of SDA-1 was thoroughly mixed with a standard propeller blade for five minutes followed by agitation in an ultrasonic bath for 30 minutes, forming a slurry. The GF had been milled prior to use to a median particle size of about 2.5 micrometers. The slurry was coated into a sheet of textured polypropylene tooling, the texture being an array of cavities, and the excess slurry was removed by a doctor blade. The cavities of the polypropylene tool were truncated, square pyramids having a depth of 180 micrometers, a base with dimensions of 250 by 250 micrometers, and a distal end with dimensions of 150 by 150 micrometers. The cavities were in a square grid array with a pitch, i.e. center to center distance between cavities, of 375 micrometers. The lateral sides forming the cavities were tapered with diminishing width toward the distal end so that the conglomerate abrasive particles were easily removed from the tooling. The textured polypropylene tooling was formed by an embossing process, wherein the texture from a metal master tool, having the inverse texture of the desired polypropylene sheet, was formed into the polypropylene. The pyramidal array of the master tool was made by a conventional diamond turning process of a metal. Embossing of the polypropylene sheet via the master tool was conducted near the melting temperature of the polypropylene following conventional embossing techniques.

While in the cavities of the tooling, the slurry was dried for one hour at room temperature, followed by additional drying in an oven at 75° C. for one hour. The dried, precursor (i.e., pre-fired) conglomerate abrasive particles were removed from the tooling by using an ultrasonically driven bar (Model 902R from Branson Ultrasonic Instruments, Danbury. Conn.).

The dried precursor conglomerate abrasive particles were vitrified by mixing with 7% by weight of Hy-AlOx, based on the weight of the precursor conglomerate abrasive particles; placing the conglomerate abrasive particles/Hy-AlOx powder mixture in a refractor sager (available from Ipsen Ceramics of Ipsen Inc., Pecatonica, Ill.) and heating in a furnace in air, firming conglomerate abrasive particles. The heating schedule for the vitrifying process was as follows: a 2° C./min temperature ramp to 400° C., a 2 hour anneal at 400° C., a 2° C./min temperature ramp to 750° C., a 1 hour anneal at 750° C., and a 2° C./min ramp to room temperature. The temporary organic binder, Standex230, of the precursor abrasive agglomerates was burned off during the vitrifying step. After the firing process, the agglomerate abrasive grains were sieved through a 150 and 250 micrometer mesh screens to remove agglomerates with a size of 250 micron and larger and to remove the Hy-AlOx particles which have a particle size under 150 microns, producing the conglomerate abrasive particles.

Examples 2-18

Examples 2-18 were prepared similarly to Example 1, except the weight percentage of the spray dried agglomerate particles in the conglomerate abrasive particles (based on a total weight of about 138.5 g of spray dried agglomerate and milled glass frit in the conglomerate abrasive particles) and the vitrifying temperature (i.e. the one hour maximum annealing temperature of the shaped conglomerate abrasive particles) was adjusted as reported in Table 1 (below).

TABLE 1

| EXAMPLE | SPRAY DRIED AGGLOMERATE | WEIGHT PRECENT OF SPRAY DRIED AGGLOMERATE IN CONGLOMERATE ABRASIVE PARTICLE | VITRIFYING TEMPERATURE OF CONGLOMERATE ABRASIVE PARTICLE, ° C. |
|---|---|---|---|
| 1 | SDA-1 | 60 | 750 |
| 2 | SDA-2 | 20 | 750 |
| 3 | SDA-2 | 40 | 750 |
| 4 | SDA-2 | 60 | 700 |
| 5 | SDA-2 | 60 | 750 |
| 6 | SDA-2 | 60 | 750 |
| 7 | SDA-2 | 60 | 750 |
| 8 | SDA-2 | 60 | 750 |
| 9 | SDA-2 | 60 | 750 |
| 10 | SDA-2 | 60 | 800 |
| 11 | SDA-2 | 80 | 750 |
| 12 | SDA-3 | 60 | 750 |
| 13 | SDA-4 | 40 | 750 |
| 14 | SDA-5 | 40 | 750 |
| 15 | SDA-6 | 20 | 800 |
| 16 | SDA-6 | 60 | 750 |
| 17 | SDA-6 | 60 | 750 |
| 18 | SDA-7 | 80 | 700 |

Figure 5:
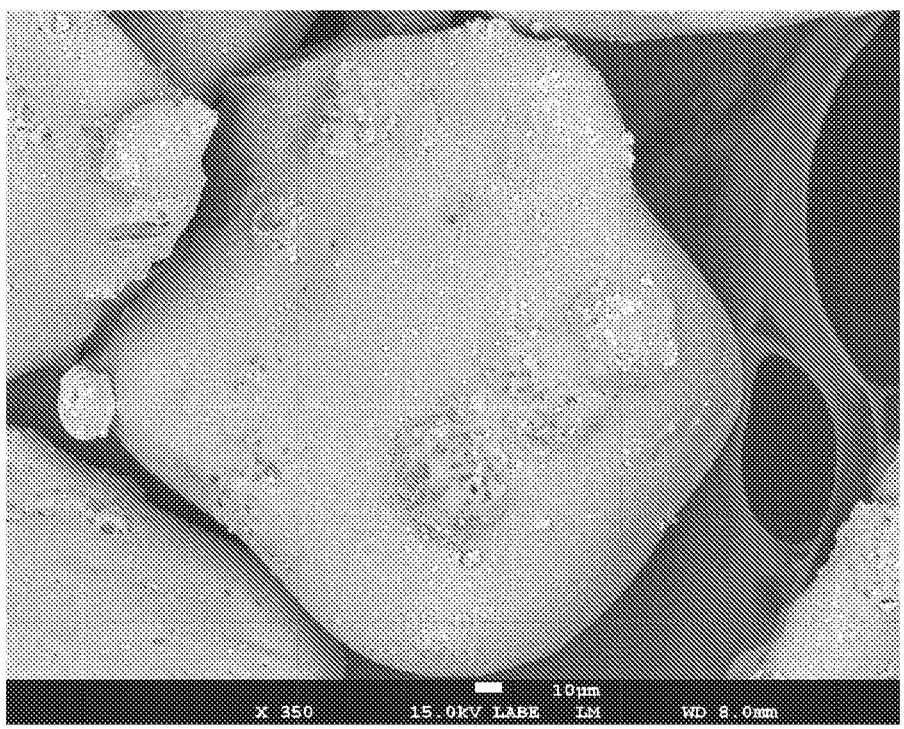
FIG. 5 is a scanning electron micrograph of conglomerate abrasive particles made in Example 13.

FIG. 5 shows conglomerate abrasive particles made in Example 13.

Structured abrasive articles comprising the conglomerate abrasive particles were prepared as generally described in U.S. Pat. No. 5,152,917 (Pieper et al.), as further described below.

Example 1A

A structured abrasive pad was prepared using the conglomerate abrasive particles of Example 1 by the following procedure. SR368D, 28.0 g; OX50, 1.0 g; IRG819, 0.3 g; VAZO 52, 0.3 g: SP32000, 1.2 g; A174, 0.7 g; W400 57.6 g; and 10.9 g of the conglomerate abrasive particles of Example 1 were mixed together to provide a resin based slurry. The resin based slurry was coated into a sheet of textured polypropylene tooling, the texture being an array of cavities. The cavities of the polypropylene tool were rectangular cube shaped having a depth of 800 micrometer, 2.36 mm×2.36 mm at the bottom of the cavities, and 2.8 mm×2.8 mm as the cavity openings. The cavities were in a square grid array with a pitch (i.e., center to center distance between cavities) of 4.0 mm. The textured propylene tooling was prepared by an embossing process, similar to that described for Example 1. The coating width of the resin based slurry was 10 inches (25.4 cm). A sheet of 5 mil (0.127 mm) thick polyester film backing was hand laminated to the resin based slurry coating, using a rubber roll applied over the polyester film backing, such that, the slurry wetted the surface of the polyester film backing. The resin based slurry coating was then cured through the backing by passing the coating, tooling and backing under two ultraviolet lamps, medium pressure mercury bulbs that generated 400 Watts/inch (157.5 Watts/cm), available from American Ultra Company, Lebanon, Ind., at a speed of about 30 feet/minute (9.1 meters/minute). The cured slurry, which was adhered to the polyester film backing, was removed from the tooling, leaving the cube shaped features attached to the backing. The backing with features was further post cured in a conventional air through oven at 90° C. for 12 hours, forming a structured abrasive pad.

Example 2A-Example 18A

Structured abrasive pads were prepared according to the procedure described for Example 1a, except the amount of conglomerate abrasive particles in the fixed abrasive pad formulation was adjusted to yield the percentage of conglomerate abrasive particles in the fixed abrasive pad, per the last column of Table 1.

Comparative Example A (CE-A)

CE-A was a fixed abrasive pad available as 3M 677XA EL TRIZACT DIAMOND TILE (6 micron diamonds) from 3M Company, St. Paul, Minn.

Structured abrasive pads corresponding to Examples 1a to 18a were evaluated for abrading performance according to the Polishing Test Method described hereinabove. Results are reported in Table 2 (below).

TABLE 2

| EXAMPLE | CONGLOMERATE ABRASIVE PARTICLE | REMOVAL RATE, MICRONS/MINUTE | WEIGHT PERCENT OF CONGLOMERATE ABRASIVE PARTICLES IN THE FIXED ABRASIVE PAD |
|---|---|---|---|
| 1a | Example 1 | 0.78 | 4.1 |
| 2a | Example 2 | 0.37 | 4.1 |
| 3a | Example 3 | 0.61 | 4.1 |
| 4a | Example 4 | 0.73 | 4.1 |
| 5a | Example 5 | 0.32 | 1.7 |
| 6a | Example 6 | 1.01 | 4.1 |
| 7a | Example 7 | 0.95 | 6.7 |
| 8a | Example 8 | 0.80 | 13.3 |
| 9a | Example 9 | 0.60 | 4.1 |
| 10a | Example 10 | 0.58 | 4.1 |
| 11a | Example 11 | 0.67 | 4.1 |
| 12a | Example 12 | 0.86 | 4.1 |
| 13a | Example 13 | 0.94 | 10.9 |
| 14a | Example 14 | 0.80 | 6.7 |
| 15a | Example 15 | 0.08 | 3.7 |
| 16a | Example 16 | 1.04 | 4.1 |
| 17a | Example 17 | 1.01 | 13.3 |
| 18a | Example 18 | 1.29 | 13.3 |
| CE-A | NA | 0.63 | 4.1 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making conglomerate abrasive particles, the method comprising:
   providing agglomerate abrasive particles comprising mineral particles in a first vitreous binder;
   combining the agglomerate abrasive particles with a second vitreous binder material precursor to form precursor conglomerate abrasive particles; and
   heating the precursor conglomerate abrasive particles to convert the second vitreous binder material precursor into a second vitreous binder, different from the first vitreous binder, thereby forming the conglomerate abrasive particles, wherein the first vitreous binder differs from the second vitreous binder by at least one of:
   i) elemental composition, or
   ii) an intrinsic physical property, and
   grading the conglomerate abrasive particles to conform to an abrasives industry specified nominal grade;
   wherein the conglomerate abrasive particles can pass through a testing sieve having 1-millimeter openings and conforming to test method ASTM E-1113.

2. A method of making conglomerate abrasive particles according to claim 1, wherein the first vitreous binder and the second vitreous binder have the same elemental composition.

3. A method of making conglomerate abrasive particles according to claim 1, wherein the first vitreous binder and the second vitreous binder have different elemental compositions.

4. A method of making conglomerate abrasive particles according to claim 1, wherein the mineral particles comprise diamond particles.

5. A method of making conglomerate abrasive particles according to claim 1, wherein said providing agglomerate abrasive particles comprises:
   forming precursor agglomerate abrasive particles comprising the mineral particles and the first vitreous binder material precursor; and
   heating the precursor agglomerate abrasive particles at a first maximum temperature to form the agglomerate abrasive particles, wherein the precursor conglomerate abrasive particles are heated at a second maximum temperature that is at least 15 degrees Celsius lower than the first maximum temperature.

6. A method of making conglomerate abrasive particles according to claim 1, wherein said forming precursor agglomerate abrasive particles comprising the mineral particles and the first vitreous binder material precursor comprises:

disposing a composition comprising the mineral particles and the first vitreous binder material precursor in a plurality of mold cavities to form the precursor agglomerate abrasive particles.

7. A method of making conglomerate abrasive particles according to claim 1, wherein the second vitreous binder is less friable than the first vitreous binder.

* * * * *

UNITED STATES PATENT AND TRADEMARK OFFICE
CERTIFICATE OF CORRECTION

PATENT NO. : 10,315,289 B2
APPLICATION NO. : 15/100585
DATED : June 11, 2019
INVENTOR(S) : Kasai et al.

It is certified that error appears in the above-identified patent and that said Letters Patent is hereby corrected as shown below:

In the Specification

Column 2
Line 42, Delete "to the to the" and insert -- to the --, therefor.

Column 2
Line 52, Delete "round." and insert -- round, --, therefor.

Column 2
Line 53, Delete "axes:" and insert -- axes; --, therefor.

Column 3
Lines 2-3, Delete "disclosure." and insert -- disclosure; --, therefor.

Column 5
Line 33, Delete "Mobs" and insert -- Mohs --, therefor.

Column 7
Lines 24-25, Delete "Engineering." and insert -- Engineering, --, therefor.

Column 7
Line 57, Delete "are is" and insert -- are --, therefor.

Column 8
Line 18, Delete "1500°," and insert -- 150° C., --, therefor.

Column 9
Line 30, Delete "Scientific." and insert -- Scientific, --, therefor.

Signed and Sealed this
Twenty-eighth Day of January, 2020

Andrei Iancu
*Director of the United States Patent and Trademark Office*

CERTIFICATE OF CORRECTION (continued)
U.S. Pat. No. 10,315,289 B2

Column 11
Line 15, Delete "material" and insert -- material, --, therefor.

Column 12
Line 62, Delete "processing:" and insert -- processing; --, therefor.

Column 14
Line 5, Delete "500° C." and insert -- 500° C., --, therefor.

Column 14
Line 32, Delete "Institute)." and insert -- Institute), --, therefor.

Column 16
Line 47, Delete "10.000" and insert -- 10,000 --, therefor.

Column 16
Line 51, Delete "percent" and insert -- percent, --, therefor. (Second Occurrence)

Column 19
Line 3, Delete "Tex.:" and insert -- Tex.; --, therefor.

Column 19
Line 11, Delete "Industries." and insert -- Industries, --, therefor.

Column 19
Line 43, Delete "-dimethylacrylamide." and insert -- -dimethylacrylamide, --, therefor.

Column 19
Line 64, Delete "-epoxxypropoxy)-" and insert -- -epoxypropoxy)- --, therefor.

Column 19
Line 67, Delete "DER-331." and insert -- DER-331, --, therefor.

Column 20
Line 1, Delete "Midland." and insert -- Midland, --, therefor.

Column 20
Line 20, Delete "al.):" and insert -- al.); --, therefor.

Column 20
Line 58, Delete "-diluoro-" and insert -- -difluoro- --, therefor.

Column 20
Line 62, Delete "1850." and insert -- 1850, --, therefor.

CERTIFICATE OF CORRECTION (continued)
U.S. Pat. No. 10,315,289 B2

Column 20
Line 66, Delete "Corporation." and insert -- Corporation, --, therefor.

Column 21
Lines 21-22, Delete "abovenmentioned" and insert -- abovementioned --, therefor.

Column 22
Line 4, Delete "oxide:" and insert -- oxide; --, therefor.

Column 23
Lines 9-10, Delete "comnmonly" and insert -- commonly --, therefor.

Column 24
Line 11, Delete "binder," and insert -- binder; --, therefor.

Column 24
Line 58, Delete "particles." and insert -- particles, --, therefor.

Column 26
Line 4, Delete "of." and insert -- of: --, therefor.

Column 30
Line 7, Delete "firming" and insert -- forming --, therefor.

Column 30
Line 67, Delete "0.3 g:" and insert -- 0.3 g; --, therefor.

Column 32
Line 7, Delete "3.7" and insert -- 1.7 --, therefor.